(12) United States Patent
Honma

(10) Patent No.: US 7,061,528 B1
(45) Date of Patent: Jun. 13, 2006

(54) SIGNAL PROCESSING APPARATUS WHICH SUPPRESSES A COLOR SIGNAL ACCORDING TO LUMINANCE LEVEL

(75) Inventor: Yoshihiro Honma, Asaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/295,323

(22) Filed: Apr. 20, 1999

(30) Foreign Application Priority Data

Apr. 24, 1998 (JP) .................................. 10-129671

(51) Int. Cl.
*H04N 5/228* (2006.01)
*H04N 5/335* (2006.01)
*H04N 9/04* (2006.01)
*H04N 9/083* (2006.01)
*H04N 9/202* (2006.01)

(52) U.S. Cl. .................. 348/222.1; 348/279; 348/280; 348/272; 348/237; 348/254; 348/234; 348/231.6; 348/223.1; 348/230.1

(58) Field of Classification Search ............... 348/279, 348/280, 272, 237, 254, 234, 231.6, 223.1, 348/222.1, 230.1, 229.1
See application file for complete search history.

(56) References Cited

U.S. PATENT DOCUMENTS

| | | | | |
|---|---|---|---|---|
| 4,680,624 A | * | 7/1987 | Murakami | .................. 348/256 |
| 4,797,733 A | * | 1/1989 | Takagi et al. | ............ 348/225.1 |
| 4,799,105 A | * | 1/1989 | Mitchell et al. | ............ 348/607 |
| 4,825,293 A | * | 4/1989 | Kobayashi et al. | ...... 348/229.1 |
| 4,903,121 A | * | 2/1990 | Uomori et al. | ............. 348/242 |
| 5,049,983 A | * | 9/1991 | Matsumoto et al. | ........ 348/273 |
| 5,115,319 A | * | 5/1992 | Arai et al. | ................ 348/230.1 |
| 5,295,001 A | * | 3/1994 | Takahashi | .................... 358/482 |
| 5,319,449 A | * | 6/1994 | Saito et al. | ............... 348/223.1 |
| 5,521,637 A | * | 5/1996 | Asaida et al. | ............ 348/222.1 |
| 5,541,648 A | * | 7/1996 | Udagawa et al. | ........ 348/222.1 |
| 5,548,330 A | * | 8/1996 | Hieda et al. | ................. 348/234 |
| 5,568,195 A | * | 10/1996 | Suzuki | .................... 348/227.1 |
| 5,581,298 A | * | 12/1996 | Sasaki et al. | ............. 348/222.1 |
| 5,583,568 A | * | 12/1996 | Suga et al. | ................. 348/234 |
| 6,040,860 A | * | 3/2000 | Tamura et al. | .............. 348/252 |
| 6,204,878 B1 | * | 3/2001 | Hieda | ..................... 348/240.99 |
| 6,388,706 B1 | * | 5/2002 | Takizawa et al. | ............ 348/273 |

* cited by examiner

*Primary Examiner*—Ngoc-Yen Yu
*Assistant Examiner*—James M. Hannett
(74) *Attorney, Agent, or Firm*—Cowan, Liebowitz & Latman, P.C.

(57) ABSTRACT

To provide a signal processing apparatus and an image pickup signal processing method both of which restrain a color signal from being influenced by band limitation in a color processing system, thereby enabling signal processing which produces an undegraded image, the processing of color-suppressing RGB signals or complementary color signals is performed between a color interpolation circuit and a color-difference matrix circuit. Otherwise, the processing of suppressing a color signal is performed in front of the color interpolation circuit.

34 Claims, 14 Drawing Sheets

F I G. 7
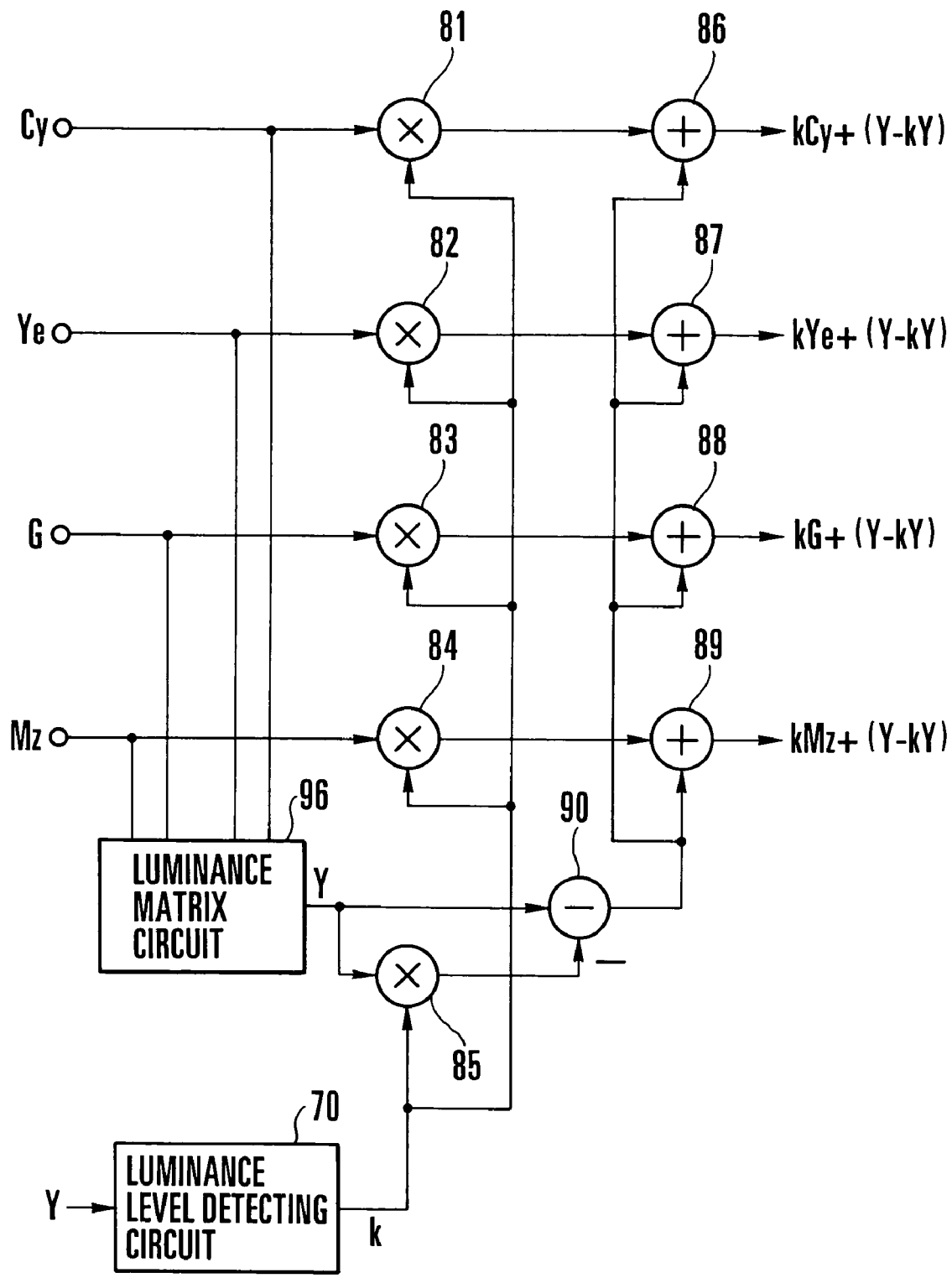

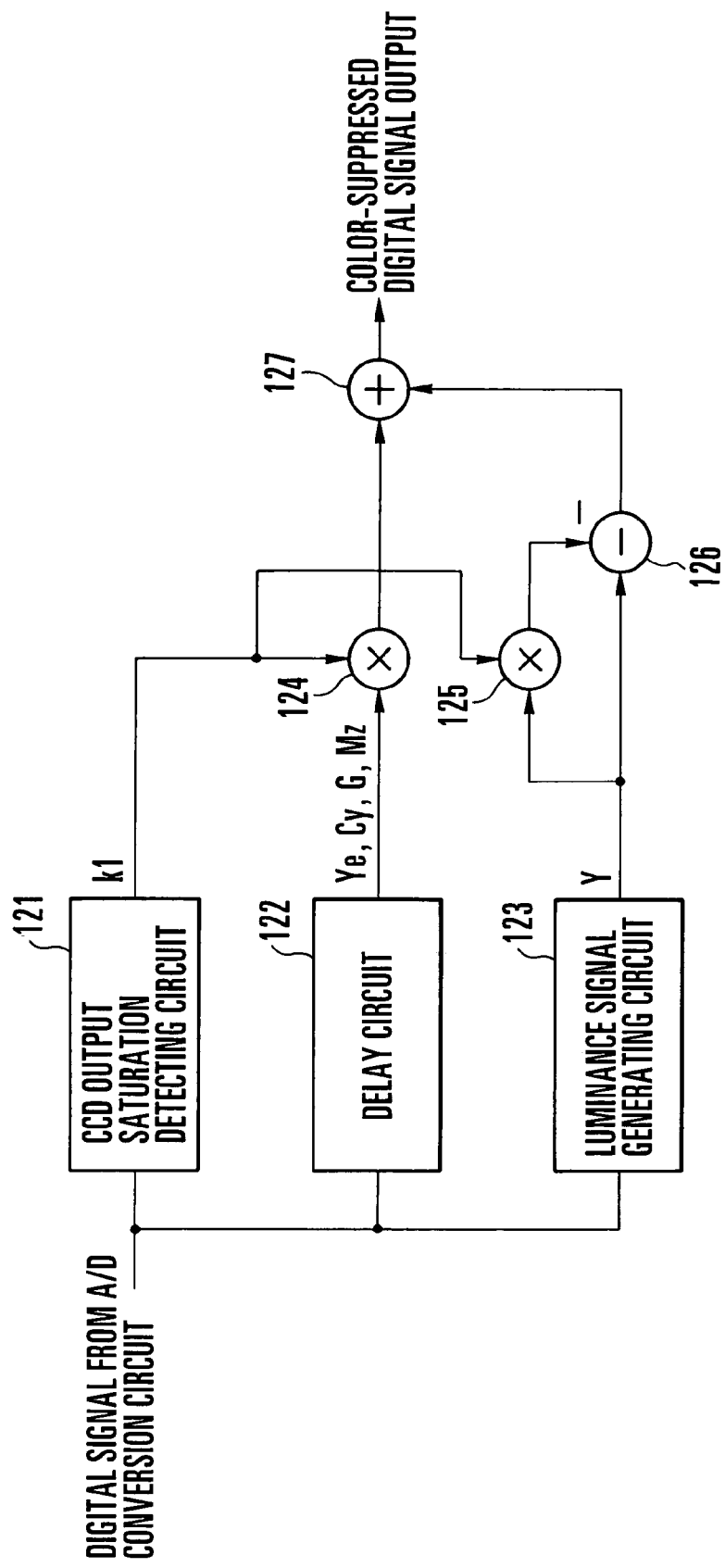

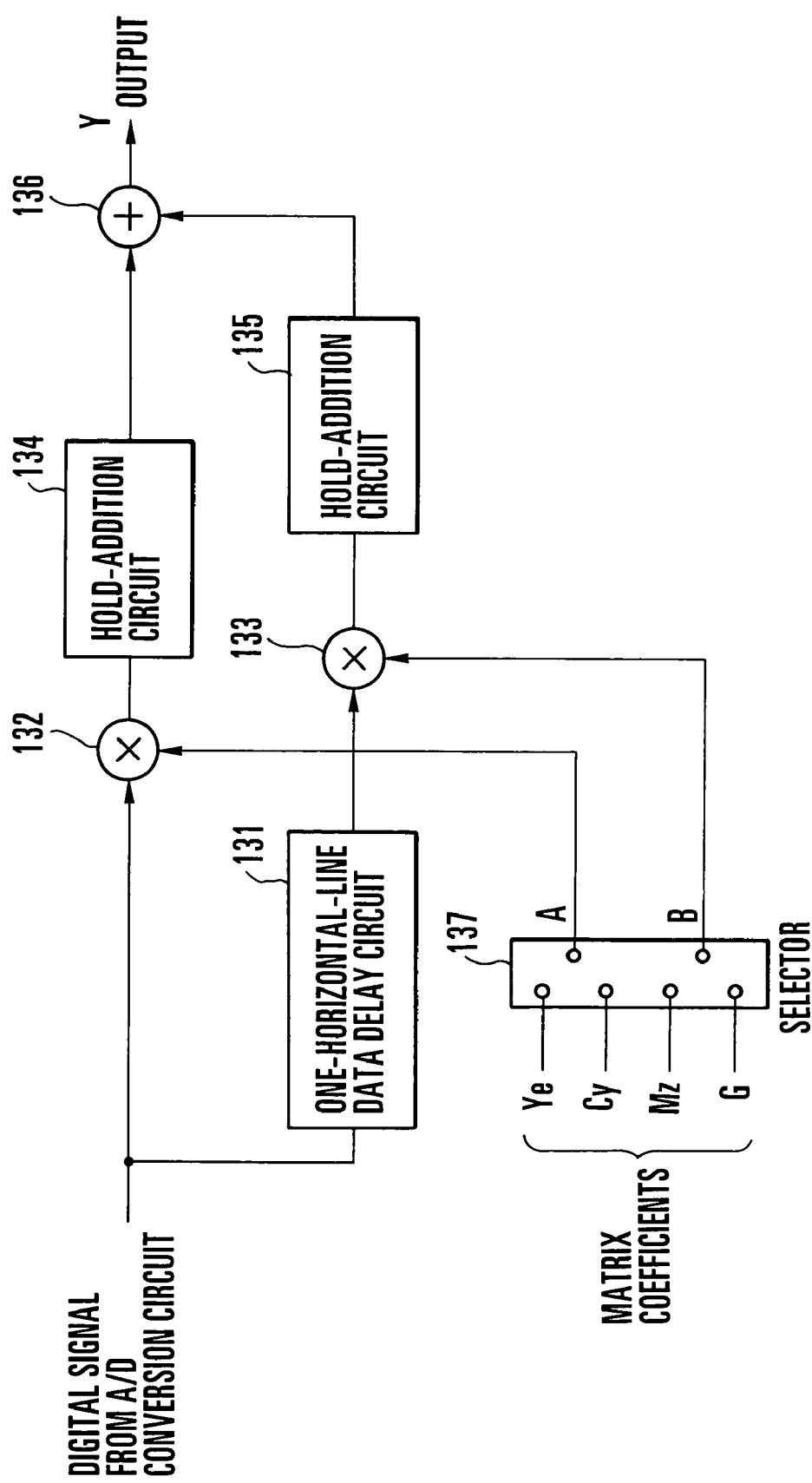

SIGNAL PROCESSING APPARATUS WHICH SUPPRESSES A COLOR SIGNAL ACCORDING TO LUMINANCE LEVEL

BACKGROUND OF THE INVENTION

1. Field of the Invention

The present invention relates to a picked-up image signal processing apparatus and a picked-up image signal processing method both of which convert a subject image into an image signal and process the image signal as a luminance signal and color-difference signals.

2. Description of Related Art

Conventionally, in a picked-up image signal processing apparatus which is arranged to convert a subject image into an image signal and process the image signal as a luminance signal and color-difference signals, the image signal is processed by signal processing blocks such as those shown in FIG. 13.

A received light image of a subject is converted into an electrical signal by a CCD 1. The electrical signal is converted from its analog form to a digital form by an A/D conversion circuit 2. The obtained digital signal is processed in both a color processing system 51 and a luminance processing system 52.

In the color processing system 51, a color interpolation circuit 3 receives the digital signal outputted from the A/D conversion circuit 2 and outputs four complementary color signals of yellow (Ye), cyan (Cy), magenta (Mz) and green (G) for each pixel of the CCD 1. These complementary color signals are converted into pure color signals of red (R), green (G) and blue (B) by a matrix circuit 4, and are outputted therefrom as RGB signals. Then, a gamma correction circuit 6 matches the RGB signals to a video signal to be visually displayed on a television monitor or the like, and a color-difference matrix circuit 7 converts the RGB signals supplied from the gamma correction circuit 6 into color-difference signals. After that, a color suppression circuit 20 eliminates color noise from a low luminance portion of each of the color-difference signals and also suppresses the color of a pixel of the CCD 1 which pixel contains a high luminance color.

In addition, the bands of the color signals are limited by the series of processing blocks of the color processing system 51 such as the color interpolation circuit 3. Specifically, the color signals contained in the digital signal outputted from the A/D conversion circuit 2 are subjected to band limiting processing by the color processing system 51, and are then converted into the color-difference signals.

In the meantime, in the luminance processing system 52, a color carrier elimination circuit 8 eliminates a color carrier component from the digital signal outputted from the A/D conversion circuit 2, thereby forming a luminance signal which is almost unprocessed. Then, an aperture correction circuit 10 raises the characteristic of a high band portion of the luminance signal. A gamma correction circuit 11 performs gamma correction on the thus-corrected luminance signal similarly to the gamma correction circuit 6 in the color processing system 51. After that, a luminance color-difference correction circuit 9 corrects the balance between color components in the luminance signal by using the color-difference signals color-suppressed by the color suppression circuit 20 of the color processing system 51, and outputs a final luminance signal.

In the conventional signal processing apparatus, the color suppression circuit 20 color-suppresses the color of a saturated pixel of the CCD 1 which pixel contains a high luminance color.

However, if the CCD 1 receives a light image of a subject of high luminance and a pixel of the CCD 1 is saturated, the influence of the saturated pixel of the CCD 1 is liable to spread over its surrounding pixels through the processing performed by a series of processing blocks such as the color interpolation circuit 3 of the color processing system 51. During the reproduction of the subject image on a television monitor or the like, the image quality of a final output image may be degraded by a false color which differs from the color of a subject, not only in a high luminance portion of the final output image but also over the surroundings of the high luminance portion.

In addition, since color suppression processing is performed at a final stage of the color processing system 51, it is necessary to execute color processing on the surroundings of the high luminance portion to prevent the degradation of image quality, so that the circuit scale of the color processing system 51 increases.

If the above-described color suppression is performed, the surroundings of the subject are color-suppressed, so that the color information of the final output image may be lost to cause degradation of its image quality.

Furthermore, the frequency band of a signal for detection of a saturated high luminance portion of the CCD 1 differs from those of color-difference signals to be color-suppressed, and if the frequency band of a signal for detection of a high luminance portion is narrower than those of color-difference signals to be color-suppressed, it may be impossible to color-suppress a correctly saturated pixel.

BRIEF SUMMARY OF THE INVENTION

The present invention has been made in view of the above-described problems, and an object of the present invention is to provide a signal processing apparatus and a picked-up image signal processing method both of which restrain a color signal from being influenced by processing performed by a color processing system, thereby enabling signal processing which prevents degradation of image quality.

To achieve the above object, in accordance with one aspect of the present invention, there is provided a signal processing apparatus which processes a signal outputted an image pickup element having filters arranged to use plural kinds of colors and which comprises interpolation means for generating a plurality of color signals for each pixel position of the image pickup element by interpolation based on signals of pixels which surround the each pixel position of the image pickup element, suppression means for suppressing the plurality of color signals generated by the interpolation means, if a level of a luminance signal is not lower than a first predetermined level and/or is lower than a second predetermined level, and color-difference matrix means for generating color-difference signals from the each of the plurality of color signals suppressed by the suppression means.

In accordance with another aspect of the present invention, there is provided a signal processing apparatus which processes a signal outputted from an image pickup element having complementary color filters and which comprises interpolation means for generating complementary color signals for each pixel position of the image pickup element by interpolation based on signals of pixels which surround the each pixel position of the image pickup element, RGB matrix means for generating RGB signals from the complementary color signals interpolated by the interpolation means, suppression means for suppressing the RGB signals generated by the RGB matrix means, if a level of a luminance signal is not lower than a first predetermined level and/or is lower than a second predetermined level, and color-difference matrix means for generating color-difference signals from the RGB signals suppressed by the suppression means.

In accordance with another aspect of the present invention, there is provided a signal processing apparatus which processes a signal outputted from an image pickup element having complementary color filters, and which comprises interpolation means for generating complementary color signals for each pixel position of the image pickup element by interpolation based on signals of pixels which surround the each pixel position of the image pickup element, suppression means for suppressing the complementary color signals interpolated by the interpolation means, if a level of a luminance signal is not lower than a first predetermined level and/or is lower than a second predetermined level, and RGB matrix means for generating RGB signals from the complementary color signals suppressed by the suppression means.

In accordance with another aspect of the present invention, there is provided a signal processing apparatus which processes a signal outputted from an image pickup element having filters arranged to use plural kinds of colors, and which comprises interpolation means for generating complementary color signals for each pixel position of the image pickup element by interpolation based on signals of pixels which surround the each pixel position of the image pickup element, and suppression means provided in front of the interpolation means, for suppressing a color signal outputted from the image pickup means, if a level of a luminance signal is not lower than a first predetermined level and/or is lower than a second predetermined level.

In accordance with another aspect of the present invention, there is provided a signal processing method which processes a signal outputted from an image pickup element having filters arranged to use plural kinds of colors, and which comprises an interpolation step of generating a plurality of color signals for each pixel position of the image pickup element by interpolation based on signals of pixels which surround the each pixel position of the image pickup element, a suppression step of suppressing the plurality of color signals generated by the interpolation step, if a level of a luminance signal is not lower than a first predetermined level and/or is lower than a second predetermined level, and a color-difference matrix step of generating color-difference signals from the plurality of color signals suppressed by the suppression step.

In accordance with another aspect of the present invention, there is provided a signal processing method which processes a signal outputted from an image pickup element having complementary color filters, and which comprises an interpolation step of generating complementary color signals for each pixel position of the image pickup element by interpolation based on signals of pixels which surround the each pixel position of the image pickup element, an RGB matrix step of generating RGB signals from the complementary color signals interpolated by the interpolation step, a suppression step of suppressing the RGB signals generated by the RGB matrix step, if a level of a luminance signal is not lower than a first predetermined level and/or is lower than a second predetermined level, and a color-difference matrix step of generating color-difference signals from the RGB signals suppressed by the suppression step.

In accordance with another aspect of the present invention, there is provided a signal processing method which processes a signal outputted from an image pickup element having complementary color filters, and which comprises an interpolation step of generating complementary color signals for each pixel position of the image pickup element by interpolation based on signals of pixels which surround the each pixel position of the image pickup element, a suppression step of suppressing the complementary color signals interpolated by the interpolation step, if a level of a luminance signal is not lower than a first predetermined level and/or is lower than a second predetermined level, and an RGB matrix step of generating RGB signals from the complementary color signals suppressed by the suppression step.

In accordance with another aspect of the present invention, there is provided a signal processing method which processes a signal outputted from an image pickup element having filters arranged to use plural kinds of colors, and which comprises an interpolation step of generating complementary color signals for each pixel position of the image pickup element by interpolation based on signals of pixels which surround the each pixel position of the image pickup element, and a suppression step provided in front of the interpolation step, of suppressing a color signal outputted from the image pickup means, if a level of a luminance signal is not lower than a first predetermined level and/or is lower than a second predetermined level.

The above and other objects, features and advantages of the present invention will become apparent from the following detailed description of preferred embodiments of the present invention, taken in conjunction with the accompanying drawings.

BRIEF DESCRIPTION OF THE SEVERAL VIEWS OF THE DRAWING

FIG. 7 is a view aiding in describing a color suppression circuit of the second embodiment;

FIG. 9 is a view aiding in describing a color suppression circuit of the third embodiment;

FIG. 10 is a view aiding in describing a luminance signal generating circuit of the third embodiment;

FIG. 14 is a view aiding in describing a conventional color suppression circuit.

DETAILED DESCRIPTION OF THE INVENTION

Preferred embodiments of the present invention will be described below in detail with reference to the accompanying drawings.

Figure 1:
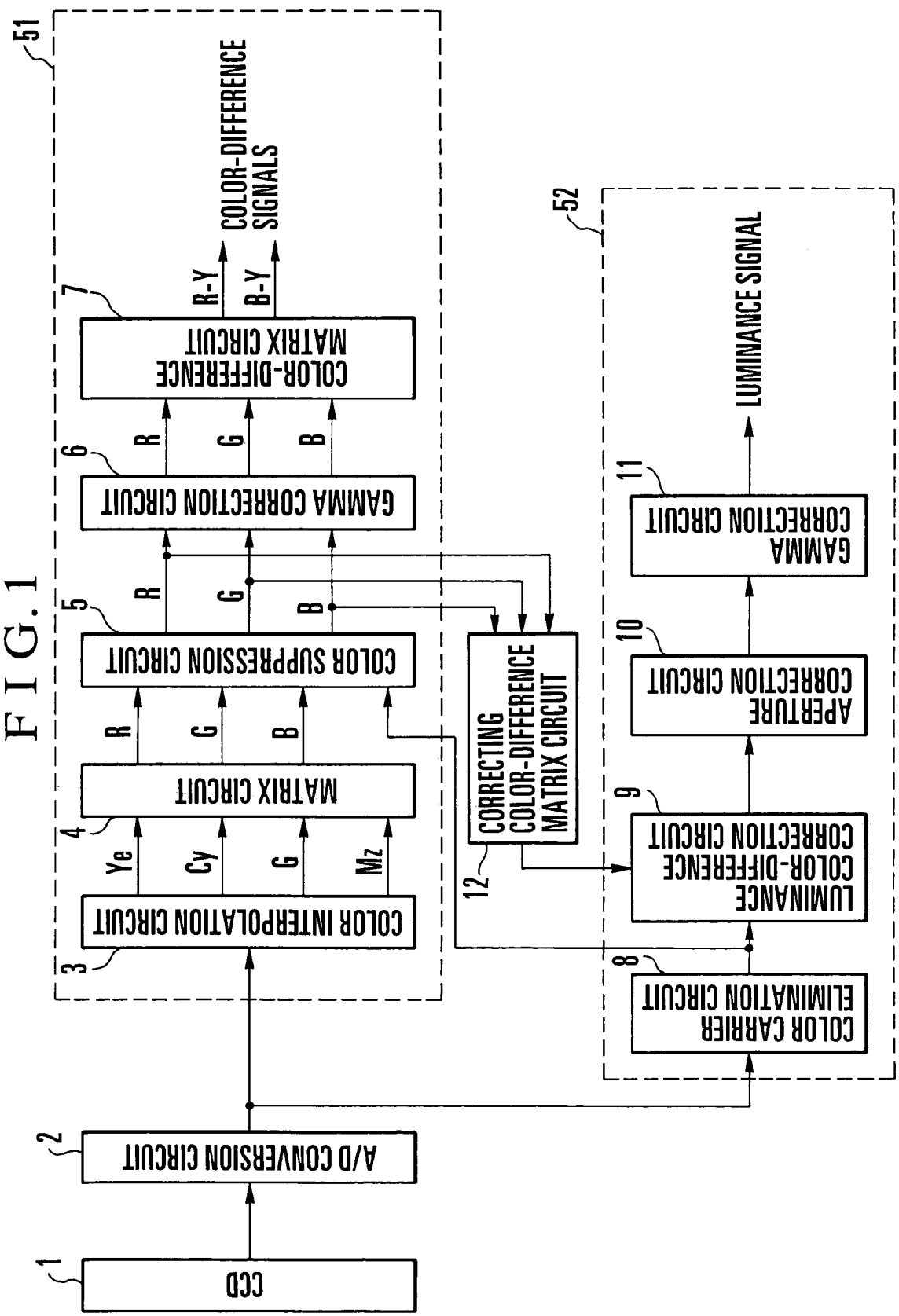
FIG. 1 is a schematic block diagram showing the construction of a signal processing apparatus according to a first embodiment.

FIG. 1 is a schematic block diagram showing a signal processing apparatus according to a first embodiment of the present invention. Each block shown in FIG. 1 will be described below.

Figure 2:
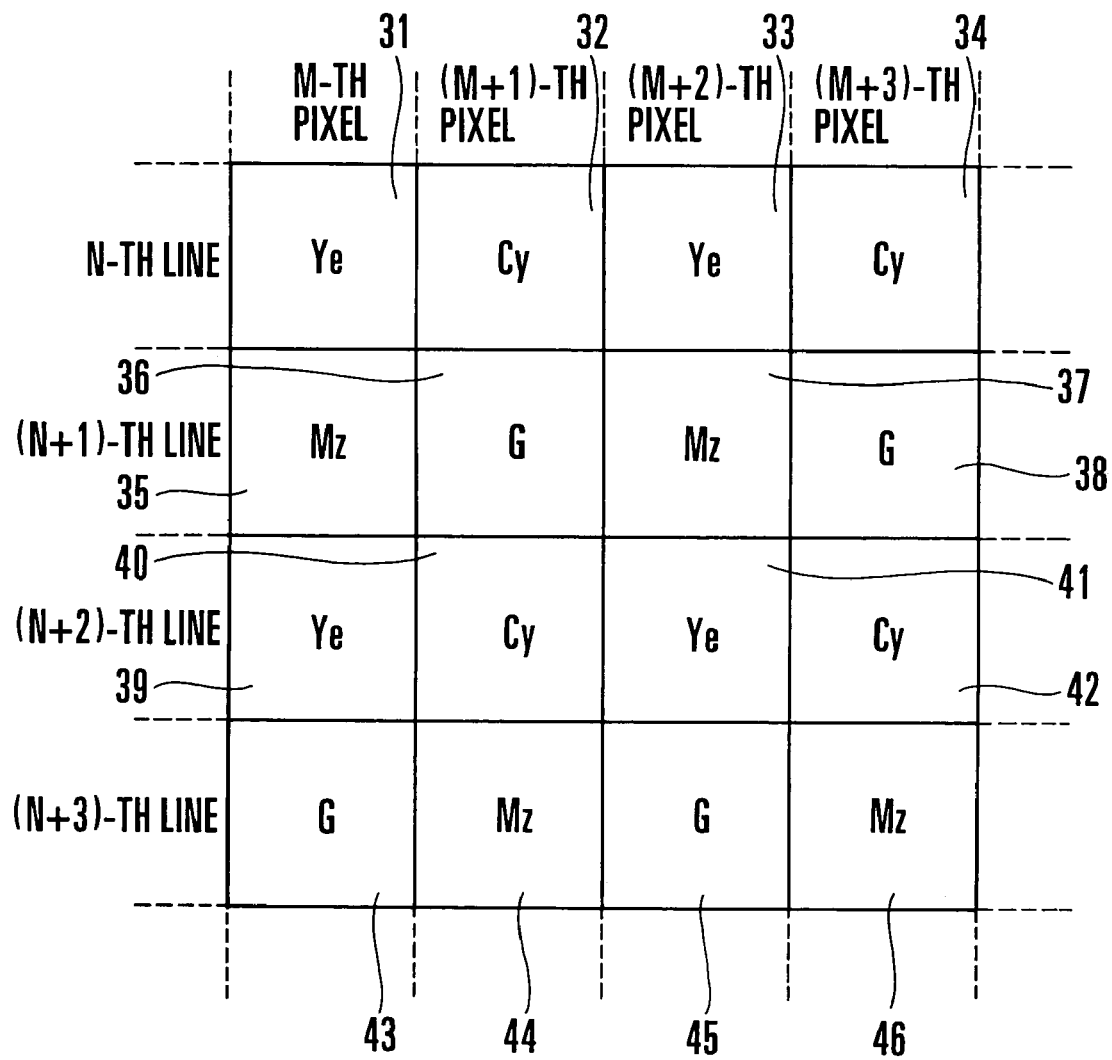
FIG. 2 is a view aiding in describing complementary color filters for a CCD.

A CCD 1 serves as image pickup means, and converts a received light image into an electrical signal and stores the electrical signal as an analog signal, and outputs the analog signal. Color filters are disposed on the surface of the light receiving part of the CCD 1. In general, color filters are divided into two major types, complementary-color type color filters and pure-color type color filters. The complementary-color type color filters include, for example, a yellow (Ye) filter, a cyan (Cy) filter, a magenta (Mz) filter and a green (G) filter, while the pure-color type color filters include, for example, a red (R) filter, a green (G) filter and a blue (B) filter. In the first embodiment as well as any other embodiment to be described later, the combination and arrangement of these two types of filters may be arbitrary. In the signal processing apparatus according to the first embodiment of the present invention, as shown in FIG. 2 by way of example, it is assumed that Ye color filters and Cy color filters are alternately arrayed along each of the N-th and (N+2)-th lines in such a manner that the Ye color filters are respectively assigned to pixels 31 and 33; 39 and 41, while the Cy color filters are respectively assigned to pixels 32 and 34; 40 and 42, and also that Mz color filters and G color filters are alternately arrayed along each of the (N+1)-th and (N+3)-th lines in such a manner that the Mz color filters are respectively assigned to pixels 35 and 37; 44 and 46, while the G color filters are respectively assigned to pixels 36 and 38; 43 and 45. In other words, it is assumed that the complementary-color type color filters in which the Ye, Cy, G and Mz color filters are arranged along the lines at a period of two pixels are used in each of the first and other embodiments to be described later.

An A/D conversion circuit 2 converts the analog signal supplied from the CCD 1 into a digital signal consisting of an arbitrary number of bits per unit. Normally, the A/D conversion circuit 2 outputs the digital signal in units of approximately ten bits.

A color processing system 51 which includes a series of processing blocks as shown in FIG. 1 serves to finally output color-difference signals. The color processing system 51 includes processing blocks 3 to 7.

A luminance processing system 52 which includes a series of processing blocks as shown in FIG. 1 serves to finally output a luminance signal. The luminance processing system 52 includes processing blocks 8 to 11.

The processing blocks 3 to 7 included in the color processing system 51 will be described below.

A color interpolation circuit 3 combines digital signals indicative of the respective colors of the complementary-color type color filters and generates four complementary color signals (Ye, Cy, Mz and G) for each pixel position on the basis of its surrounding pixels. That is to say, the color interpolation circuit 3 generates missing color signals at each pixel position by performing interpolation processing based on its surrounding pixels.

A matrix circuit 4 matrix-converts the complementary color signals into three pure color signals (R, G and B) and outputs the RGB signals. The matrix circuit 4 is arranged to output optimum RGB signals by appropriately varying its matrix coefficients in terms of factors such as the spectral sensitivity characteristics of the color filters and the color temperature of each subject.

A color suppression circuit 5 eliminates the color noise of a low luminance portion from each of the RGB signals outputted from the matrix circuit 4, and suppresses the high and low luminance portions of each of the RGB signals to reduce a false color caused by the saturation of pixels in the high luminance portion. That is to say, the color suppression circuit 5 detects the low or high luminance portion of a luminance signal and controls the levels of the RGB colors according to the detection result.

A gamma correction circuit 6 performs gamma correction to output each of the RGB signals, for example, a 10-bit input signal as an 8-bit signal.

A color-difference matrix circuit 7 converts the RGB signals into a color-difference signal R-Y and a color-difference signal B-Y.

Each processing block included in the luminance processing system 52 will be described below.

A color carrier elimination circuit 8 eliminates a color carrier component from a digital signal supplied from the A/D conversion circuit 2, by means of a low-pass filter or the like, and outputs only a luminance signal.

A luminance color-difference correction circuit 9 corrects the balance between color components in the luminance signal by using a color signal because if the color temperature of a subject greatly deviates from a color temperature which is previously set for the color filters of the CCD 1, the balance between the color components of the luminance signal is lost. For example, if the color temperature of a subject is lower than a color temperature which is previously set for the color filters of the CCD 1, the luminance component of a red portion of the subject which is processed and reproduced by the signal processing apparatus increases and the color of the subject becomes unable to be faithfully reproduced. The luminance color-difference correction circuit 9 corrects such a color reproduction.

An aperture correction circuit 10 corrects a high-frequency signal component which is lost in an optical low-pass filter (not shown) before a received light image reaches the CCD 1, or in the low-pass filter of the color carrier elimination circuit 8 or the like.

A gamma correction circuit 11 performs gamma correction to output the luminance signal, for example, a 10-bit input signal as an 8-bit signal. The gamma correction circuit 11 corrects the inverse gamma characteristic of a television monitor or the like to reproduce a linear video image on the screen of the television monitor or the like. The gamma correction circuit 11 serves as an important circuit block for not only such television monitor but also printer output or JPEG compression as well as far higher image quality.

A correcting color-difference matrix circuit 12 is positioned between the color processing system 51 and the luminance processing system 52, and produces, from the RGB signals supplied from the color suppression circuit 5 of the color processing system 51, color-difference signals for correction of luminance color difference which are to be used in the luminance color-difference correction circuit 9 of the luminance processing system 52.

The color suppression circuit 5 of the signal processing apparatus according to the first embodiment of the present invention will be described below with reference to FIG. 3.

The color suppression circuit 5 includes a luminance matrix circuit 69, a luminance level detecting circuit 70, multipliers 61 to 64, adders 65 to 67 and a subtracter 68.

The luminance matrix circuit 69 is a circuit which is not used in the color suppression circuit of the conventional signal processing apparatus. As shown in FIG. 14, in the conventional signal processing apparatus, a color gain coefficient k is calculated by a luminance level detecting circuit 71, and input color-difference signals R-Y and B-Y are respectively multiplied by the color gain coefficient k in multipliers 72 and 73 and color-difference signals k(R-Y) and k(B-Y) are outputted from the respective multipliers 72 and 73. As is apparent from FIG. 14, the signals inputted to the color suppression circuit are such color-difference signals. However, in the first embodiment of the present invention, since the signals inputted to the color suppression circuit 5 are the RGB signals, the luminance matrix circuit 69 for matrix-converting the RGB signals into a luminance signal Y is incorporated.

Figure 4:
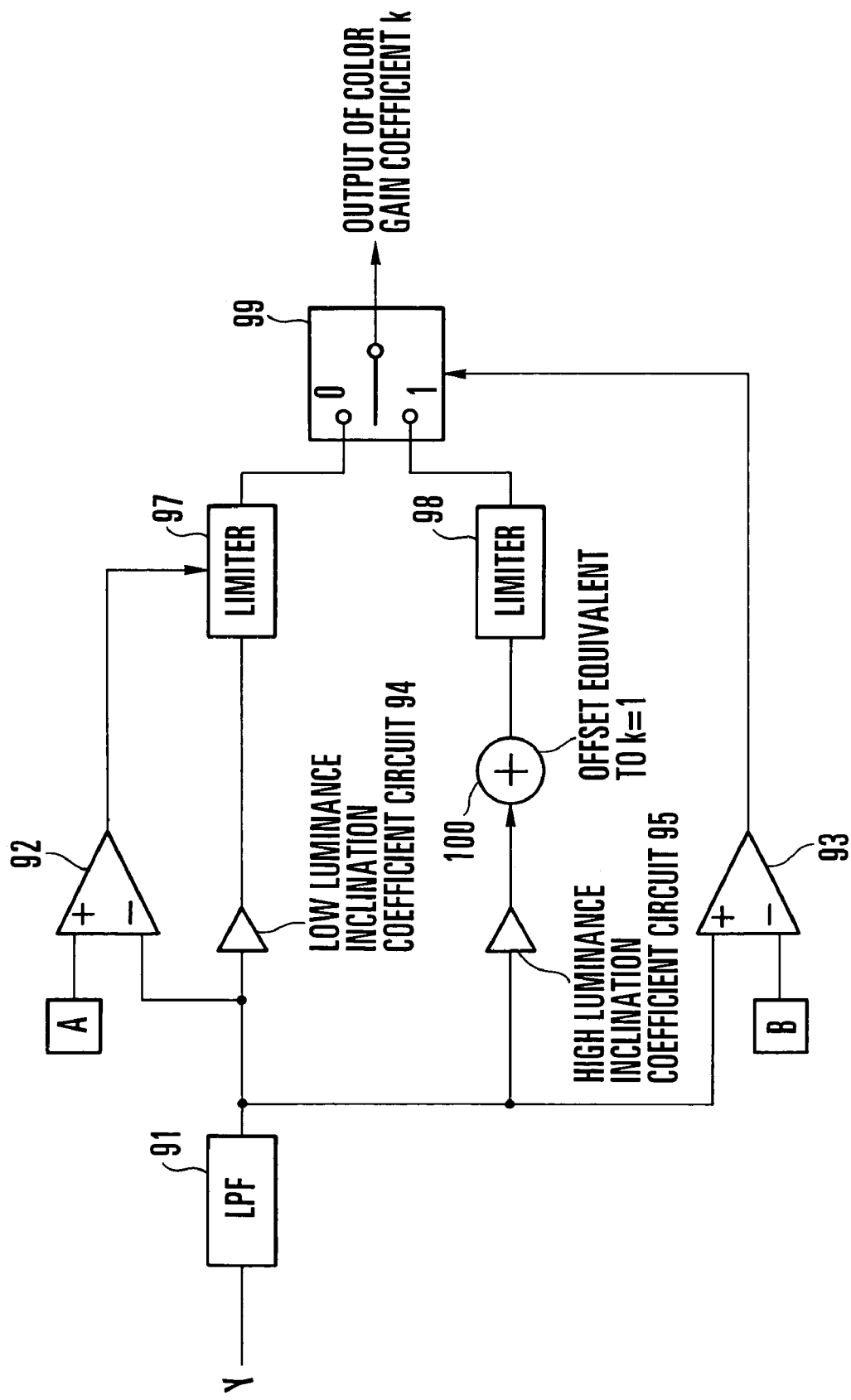
FIG. 4 is a view aiding in describing a luminance level detecting circuit of the first embodiment.

As shown in FIG. 4, the luminance level detecting circuit 70 used in the first embodiment of the present invention includes a low-pass filter (LPF) 91, comparators 92 and 93, a low luminance inclination coefficient circuit 94, a high luminance inclination coefficient circuit 95, limiters 97 and 98, and a selector 99. The luminance level detecting circuit 70 outputs the color gain coefficient k according to the input luminance signal Y within the color suppression circuit 5.

The low-pass filter (LPF) 91 limits the band of the luminance signal Y. The frequency band of the low-pass filter (LPF) 91 is wider than or equal to the frequency band of a signal indicative of a color to be color-suppressed. This is because it is necessary to prevent the color suppression circuit 5 from suppressing not only the signal indicative of the color to be color-suppressed but only signals indicative of its surrounding colors if the frequency band of the low-pass filter (LPF) 91 is narrower than the frequency band of a signal indicative of a color to be color-suppressed. If not only a signal indicative of the color of a specified pixel but also signals indicative of the colors of its surrounding pixels are to be color-suppressed, the low-pass filter (LPF) 91 performs color suppression on not only the specified pixel but also the surrounding pixels. Accordingly, the frequency band of a signal to be used for detection of a luminance portion does not become narrower than those of color-difference signals to be color-suppressed, whereby it becomes possible to correctly perform color suppression on a saturated pixel.

The comparator 92 compares a low luminance portion color noise boundary level (A) which is a reference value and the level of the luminance signal Y which is the output from the low-pass filter (LPF) 91. If the level of the luminance signal Y is not lower than the low luminance portion color noise boundary level (A), the comparator 92 controls the limiter 97 to set the color gain coefficient k to "1". On the other hand, if the level of the luminance signal Y is lower than the low luminance portion color noise boundary level (A), the output from the low-pass filter (LPF) 91 is multiplied by a coefficient indicative of an inclination "a" of an increasing straight line on the side of a low luminance portion by the low luminance inclination coefficient circuit 94, and the result of this multiplication is outputted from the limiter 97. If the coefficient indicative of the inclination "a" is so large that the color gain coefficient k exceeds "1" before the level of the luminance signal Y reaches the low luminance portion color noise boundary level (A), the low luminance inclination coefficient circuit 94 controls the limiter 97 to fix the color gain coefficient k to "1".

The comparator 93 compares a high luminance portion color suppression boundary level (B) which is a reference value and the output from the low-pass filter (LPF) 91. If the level of the luminance signal Y is not higher than the high luminance portion color suppression boundary level (B), the selector 99 selects the output side of the limiter 97 to set the color gain coefficient k to "1". On the other hand, if the level of the luminance signal Y is higher than the high luminance portion color suppression boundary level (B), the selector 99 selects the output side of the limiter 98 and an adder 100 adds together the value obtained by multiplying the output from the low-pass filter (LPF) 91 by an inclination coefficient -b in the high luminance inclination coefficient circuit 95, and an offset value equivalent to k=1, thereby realizing a decreasing straight line on the side of a high luminance portion. It is to be noted that the limiter 98 is arranged to provide no negative output.

Figure 5:
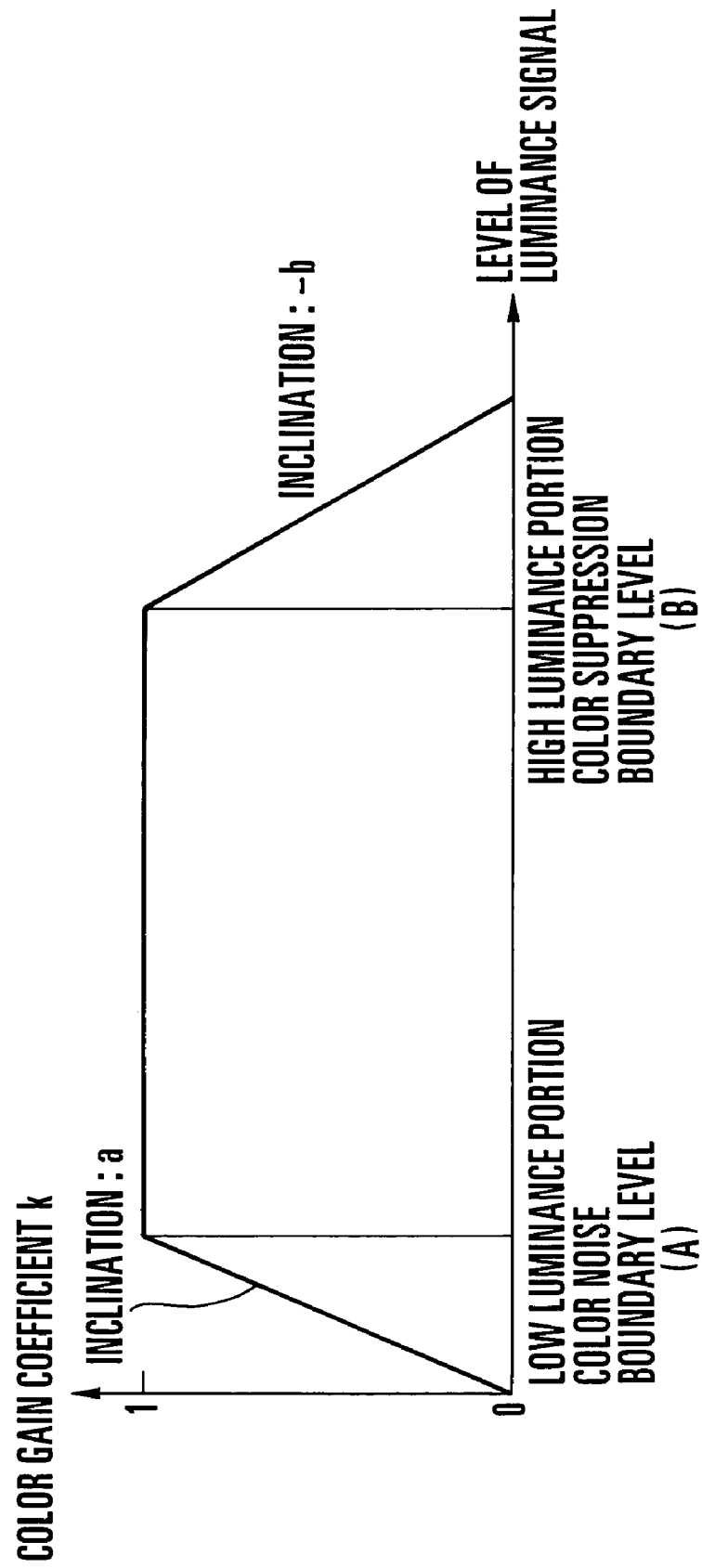
FIG. 5 is a view aiding in describing the relation in which a luminance level detecting circuit of the first embodiment outputs a color gain coefficient k on the basis of the level of a luminance signal Y.

Accordingly, the luminance level detecting circuit 70 is capable of outputting the color gain coefficient k from the level of the luminance signal Y, and the relation between the color gain coefficient k and the level of the luminance signal Y is as shown in FIG. 5.

As shown in FIG. 5, the luminance level detecting circuit 70 calculates the color gain coefficient k so that before the level of the luminance signal Y reaches the low luminance portion color noise boundary level (A), the color gain coefficient k increases along a locus of rectilinear inclination "a" as the level of the luminance signal Y rises, thereby eliminating color noise from the low luminance portion. If the level of the luminance signal Y rises above the low luminance portion color noise boundary level (A), the luminance level detecting circuit 70 calculates the color gain coefficient k to fix the color gain coefficient k to constant "1", and if the level of the luminance signal Y exceeds the high luminance portion color suppression boundary level (B), the luminance level detecting circuit 70 calculates the color gain coefficient k so that the color gain coefficient k decreases along a locus of rectilinear inclination "-b" as the level of the luminance signal Y rises, thereby suppressing the color of the high luminance portion.

The operation of the color suppression circuit 5 will be described below with reference to FIG. 3.

As described previously, the signals inputted to the color suppression circuit 5 are the RGB signals, and the luminance matrix circuit 69 can effect color suppression by converting the RGB signals into the luminance signal Y by using a matrix conversion which is given by the following expression:

$$\begin{pmatrix} Y \\ R-Y \\ B-Y \end{pmatrix} = \begin{pmatrix} 0.3 & 0.59 & 0.11 \\ 0.7 & -0.59 & -0.11 \\ -0.3 & -0.59 & 0.89 \end{pmatrix} \begin{pmatrix} R \\ G \\ B \end{pmatrix}. \quad (1)$$

The expression (1) gives an expression (2):

$$\begin{pmatrix} R \\ G \\ B \end{pmatrix} = \begin{pmatrix} 1 & 1 & 0 \\ 1 & -0.3/0.59 & -0.11/0.59 \\ 1 & 0 & 1 \end{pmatrix} \begin{pmatrix} Y \\ R-Y \\ B-Y \end{pmatrix}. \quad (2)$$

In terms of the color gain coefficient k, the following expression (3) is given:

$$\begin{pmatrix} R \\ G \\ B \end{pmatrix} = \begin{pmatrix} 1 & k & 0 \\ 1 & (-0.3/0.59)k & (-0.11/0.59)k \\ 1 & 0 & k \end{pmatrix} \begin{pmatrix} Y \\ R-Y \\ B-Y \end{pmatrix}. \quad (3)$$

If the expression (3) is expanded, then $$R=Y+k(R-Y)=kR+(Y-kY), \quad (4)$$

$$G=Y+k(G-Y)=kG+(Y-kY), \quad (5)$$

$$B=Y+k(B-Y)=kB+(Y-kY). \quad (6)$$

Figure 3:
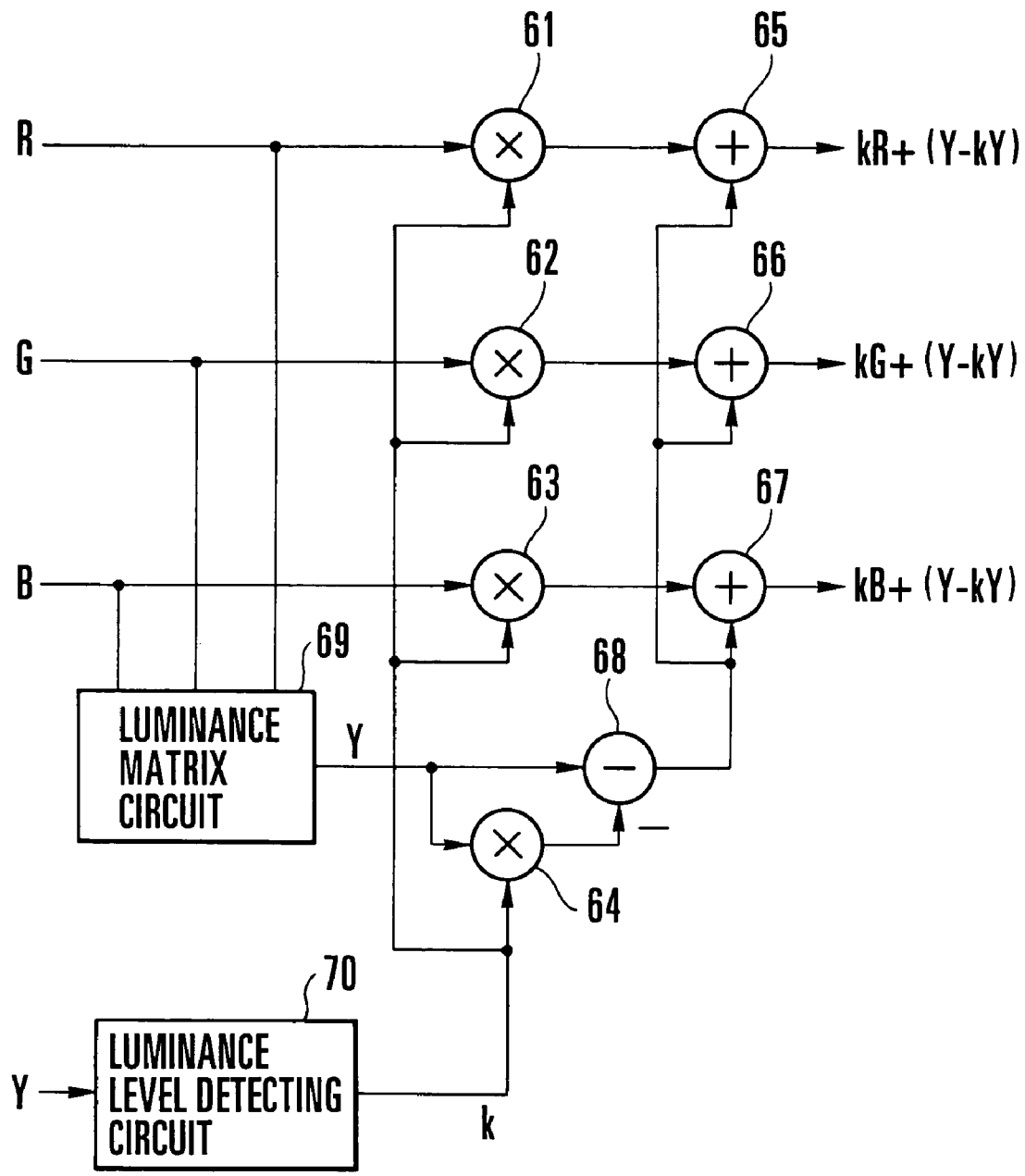
FIG. 3 is a view aiding in describing a color suppression circuit of the first embodiment.

Specifically, in the color suppression circuit 5, as shown in FIG. 3, the above-described luminance level detecting circuit 70 first calculates the color gain coefficient k which ranges from "0" to "1", the color gain coefficient k being used for color-suppressing the color-difference signals on the basis of the luminance signal Y. In the meantime, the R signal, the G signal and the B signal which are the RGB signals inputted to the color suppression circuit 5 are respectively multiplied by the calculated color gain coefficients k by the multipliers 61, 62 and 63. In the meantime, the luminance signal Y which is obtained by the matrix conversion of the R signal, the G signal and the B signal which are the RGB signals inputted to the color suppression circuit 5, by means of the luminance matrix circuit 69, is multiplied by the color gain coefficient k in the multiplier 64, and the product outputted from the multiplier 64 is subtracted from the original luminance signal Y by the subtracter 68. The subtracter 68 provides an output of (Y−kY). Thus, the R signal, the G signal and the B signal each of which has been multiplied by k in the above-described manner are respectively added to the outputs of (Y−kY) by the adders 65, 66 and 67, and color-suppressed RGB signals are formed. In other words, the respective rightmost sides of the above-noted expressions (4), (5) and (6) are outputted. In the color suppression of each of the RGB signals, as the color gain coefficient k becomes closer to "0", the level of each of the original RGB signals is decreased and the RGB signals are color-suppressed. Conversely, if the color gain coefficient k is "1", the original RGB signals remain unchanged. Therefore, the color suppression circuit 5 can eliminate color noise from the low luminance portion of each of the input RGB signals and also suppress a false color caused by a saturated pixel of the CCD 1 which pixel contains a high luminance color.

The signal processing operation of the signal processing apparatus according to the first embodiment of the present invention will be described below with reference to FIG. 1.

A received light image of a subject is converted into an electrical signal by the CCD 1, and is then converted from its analog form to a digital form by the A/D conversion circuit 2. The A/D-converted digital signal is processed in both the color processing system 51 and the luminance processing system 52.

In the color processing system 51, the color interpolation circuit 3 receives the digital signal outputted from the A/D conversion circuit 2 and outputs four complementary color signals of yellow (Ye), cyan (Cy), magenta (Mz) and green (G) for each pixel of the CCD 1. These complementary color signals are converted into pure color signals of red (R), green (G) and blue (B) by the matrix circuit 4, and are outputted therefrom as RGB signals. Then, the color suppression circuit 5 detects a low luminance portion or a high luminance portion from the level of a luminance signal supplied from the color carrier elimination circuit 8 of the luminance processing system 52 and eliminates color noise from the low luminance portion of each of the RGB signals, and also suppresses the colors of saturated individual pixels of the CCD 1 which pixels contain high luminance colors. Then, the gamma correction circuit 6 matches the color-suppressed RGB signals to a video signal to be visually displayed on a television monitor or the like, and the color-difference matrix circuit 7 converts the RGB signals supplied from the gamma correction circuit 6 into color-difference signals and outputs the color-difference signals.

In addition, the bands of the color signals are limited by the series of processing blocks of the color processing system 51 such as the color interpolation circuit 3. Specifically, the color signals contained in the digital signal outputted from the A/D conversion circuit 2 are subjected to band limiting processing by the color processing system 51, and are then converted into the color-difference signals.

In the meantime, in the luminance processing system 52, the color carrier elimination circuit 8 eliminates a color carrier component from the digital signal outputted from the A/D conversion circuit 2, thereby forming a luminance signal which is almost unprocessed. Then, the luminance color-difference correction circuit 9 corrects the balance between the color components in the luminance signal with color-difference signals for correction of luminance color differences. The color-difference signals for correction of luminance color differences are produced from the RGB signal outputs processed by the color suppression circuit 5, through the matrix conversion of the correcting color-difference matrix circuit 12. Then, the aperture correction circuit 10 raises the characteristic of a high band portion of the luminance signal. The gamma correction circuit 11 performs gamma correction on the thus-corrected luminance signal similarly to the gamma correction circuit 6 in the color processing system 51, and outputs a final luminance signal.

In other words, since color suppression for a high luminance portion is performed in the process of RGB signal processing, a luminance correction signal is generated by using color signals which are not yet subjected to the processing of the gamma correction circuit 6. Accordingly, the luminance color-difference correction circuit 9 can be disposed before the aperture correction circuit 10 or the gamma correction circuit 11 in the luminance processing system 52. With this arrangement, even if the color temperature of a subject greatly deviates from the set color temperatures of the color filters of the CCD 1, the color balance in the luminance signal is prevented from being impaired.

As described above, the influence of a saturated pixel of the CCD 1 is restrained from spreading over its surrounding pixels, whereby during the reproduction of a subject image on a television monitor or the like, its image quality is restrained from being degraded by a false color which differs from the color of a subject, not only in a high luminance portion of a final output image but also over the surroundings of the high luminance portion.

Figure 6:
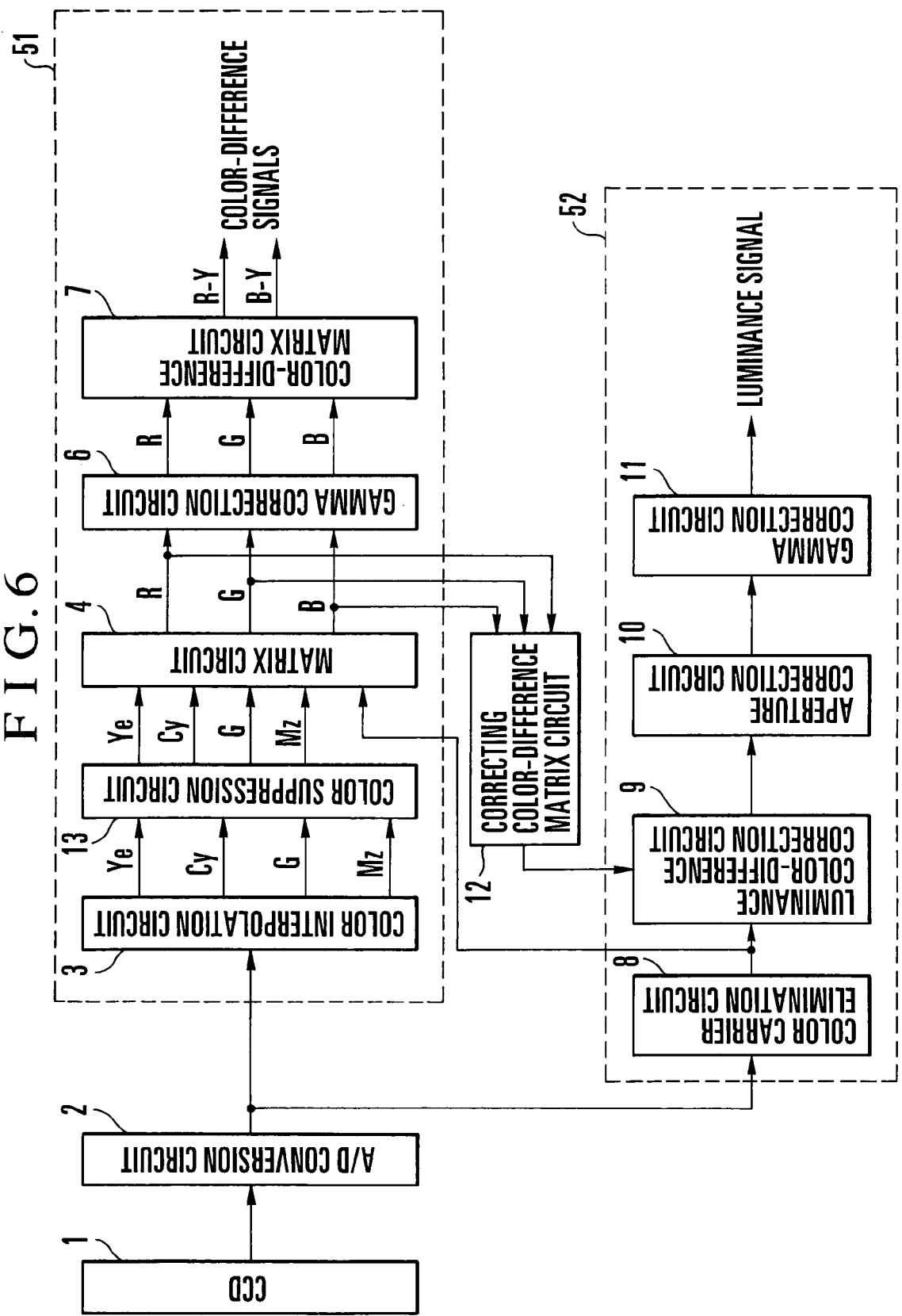
FIG. 6 is a schematic block diagram showing the construction of a signal processing apparatus according to a second embodiment.

FIG. 6 is a schematic block diagram showing a signal processing apparatus according to a second embodiment of the present invention.

In the signal processing apparatus according to the second embodiment of the present invention, the CCD 1, the A/D conversion circuit 2, the color interpolation circuit 3, the matrix circuit 4, the gamma correction circuit 6, the color-difference matrix circuit 7, the color carrier elimination circuit 8, the luminance color-difference correction circuit 9, the aperture correction circuit 10, the gamma correction circuit 11 and the correcting color-difference matrix circuit 12 are identical to the corresponding processing blocks of the signal processing apparatus according to the first embodiment of the present invention. However, a color suppression circuit 13 differs from the color suppression circuit 5 used in the first embodiment of the present invention, and is characterized by being capable of detecting a low luminance portion or a high luminance portion of a luminance signal and controlling the levels of the respective colors to perform color suppression on the complementary colors outputted from the color interpolation circuit 3, before the processing of the matrix circuit 4. Specifically, in the signal processing apparatus according to the first embodiment of the present invention, the color suppression circuit 5 of the color processing system 51 processes the RGB signals outputted from the matrix circuit 4 and outputs the processed RGB signals to the gamma correction circuit 6, whereas in the signal processing apparatus according to the second embodiment of the present invention, the color suppression circuit 13 of the color processing system 51 processes the complementary color signals outputted from the color interpolation circuit 3 and outputs the processed signals to the matrix circuit 4. The second embodiment differs from the first embodiment in the above-described processing procedure, and the other signal processing of the second embodiment is identical to that of the first embodiment. For this reason, the color suppression circuit 13 will be mainly described below with reference to FIG. 7.

The color suppression circuit 13 includes a luminance matrix circuit 96, the luminance level detecting circuit 70, multipliers 81 to 85, adders 86 to 89 and a subtracter 90.

In the color suppression circuit 13, the complementary color signals are inputted to the luminance matrix circuit 96, and the luminance matrix circuit 91 matrix-converts these complementary color signals into a luminance signal Y.

The luminance level detecting circuit 70 is identical to that used in the previously-described first embodiment of the present invention, and the description of the same is omitted for the sake of simplicity.

The operation of the color suppression circuit 13 will be described below with reference to FIG. 7.

As described previously, the signals inputted to the color suppression circuit 13 are the complementary color signals, and the luminance matrix circuit 96 can effect color suppression by converting the complementary color signals into the luminance signal Y by using a matrix conversion which is given by the following expression:

$$\begin{pmatrix} Cy \\ Ye \\ G \\ Mz \end{pmatrix} = \begin{pmatrix} m11 & m12 & m13 \\ m21 & m22 & m23 \\ m31 & m32 & m33 \\ m41 & m42 & m43 \end{pmatrix} \begin{pmatrix} R \\ G \\ B \end{pmatrix}. \quad (7)$$

The expression (7) and the previously-described expression (2) give an expression (8):

$$\begin{pmatrix} Cy \\ Ye \\ G \\ Mz \end{pmatrix} = \begin{pmatrix} m11 & m12 & m13 \\ m21 & m22 & m23 \\ m31 & m32 & m33 \\ m41 & m42 & m43 \end{pmatrix} \begin{pmatrix} 1 & 1 & 0 \\ 1 & -0.3/0.59 & -0.11/0.59 \\ 1 & 0 & 1 \end{pmatrix} \begin{pmatrix} Y \\ R-Y \\ B-Y \end{pmatrix}. \quad (8)$$

In terms of the color gain coefficient k, the following expression (9) is given:

$$\begin{pmatrix} Cy \\ Ye \\ G \\ Mz \end{pmatrix} = \begin{pmatrix} m11 & m12 & m13 \\ m21 & m22 & m23 \\ m31 & m32 & m33 \\ m41 & m42 & m43 \end{pmatrix} \begin{pmatrix} 1 & 1 & 0 \\ 1 & (-0.3/0.59)k & (-0.11/0.59)k \\ 1 & 0 & 1 \end{pmatrix} \begin{pmatrix} Y \\ R-Y \\ B-Y \end{pmatrix}. \quad (9)$$

If the expression (9) is expanded, for example, Cy is expressed as follows:
Cy=m11[Y+k(R−Y)]+m12[Y+k(G−Y)]+m13[Y+k(B−Y)]=(m11+m12+m13)Y—(m11+m12+m13)kY+k(m11R+m12G+m13B)=(m11+m12+m13)(Y−kY)+kCy, where (m11+m12+m13) is the total of component ratios, i.e., "1". Therefore, $$Cy=(Y-kY)+kCy. \quad (10)$$

Similarly, regarding Ye, G and Mz, $$Ye=(Y-kY)+kYe, \quad (11)$$

$$G=(Y-kY)+kG, \quad (12)$$

$$Mz=(Y-kY)+kMz. \quad (13)$$

Specifically, as in the case of the first embodiment, in the color suppression circuit 13, as shown in FIG. 7, the luminance level detecting circuit 70 first calculates the color gain coefficient k which ranges from "0" to "1", the color gain coefficient k being used for color-suppressing the color-difference signals on the basis of the luminance signal Y. In the meantime, the Cy signal, the Ye signal, the Mz signal and the G signal which are the complementary color signals inputted to the color suppression circuit 13 are respectively multiplied by the calculated color gain coefficients k by the multipliers 81 to 84. In the meantime, the luminance signal Y which is obtained by the matrix conversion of the Cy signal, the Ye signal, the Mz signal and the G signal which are the complementary color signals inputted to the color suppression circuit 13, by means of the luminance matrix circuit 96, is multiplied by the color gain coefficient k in the multiplier 85, and the product output from the multiplier 85 is subtracted from the original luminance signal Y by the subtracter 90. The subtracter 90 provides an output of (Y−kY). Thus, the Cy signal, the Ye signal, the Mz signal and the G signal each of which has been multiplied by k in the above-described manner are respectively added to the outputs of (Y−kY) by the adders 86 to 89, and color-suppressed complementary color signals are formed. In other words, the respective right-hand sides of the above-noted expressions (10) to (13) are outputted. In the color suppression of each of the complementary color signals, as the color gain coefficient k becomes closer to "0", the level of each of the original complementary color signals is decreased and the complementary color signals are color-suppressed. Conversely, if the color gain coefficient k is "1", the original complementary color signals remain unchanged. Therefore, the color suppression circuit 13 can eliminate color noise from the low luminance portion of each of the input complementary color signals and also suppress the color of a saturated pixel of the CCD 1 which pixels contains a high luminance color.

The signal processing operation of the signal processing apparatus according to the second embodiment of the present invention will be described below with reference to FIG. 6. The following description will focus on the features of the second embodiment which differ from those of the first embodiment.

In the color processing system 51, the color interpolation circuit 3 outputs complementary color signals relative to each pixel of the CCD 1. In the color suppression circuit 13 according to the second embodiment of the present invention, the complementary color signals are color-suppressed, and the color-suppressed complementary color signals are converted into pure-color RGB signals by the matrix circuit 4. Subsequently, the pure-color RGB signals are processed in a manner similar to that of the first embodiment of the present invention, and are outputted as color-difference signals.

In the luminance processing system 52, a luminance signal is generated in a manner similar to that of the first embodiment of the present invention, but since the color suppression circuit 13 of the second embodiment of the present invention outputs the complementary color signals, the luminance color-difference correction circuit 9 is arranged to perform luminance color-difference correction by using color-difference signals which are formed from the RGB signals formed by matrix conversion in the matrix circuit 4, through matrix conversion by the correcting color-difference matrix circuit 12.

As described above, in the second embodiment of the present invention, the color suppression circuit 13 of the color processing system 51 processes the complementary color signals outputted from the color interpolation circuit 3 and outputs the color-suppressed complementary color signals to the matrix circuit 4, whereby it is not necessary to enlarge an area to be color-suppressed, as compared with an area to be color-suppressed in the first embodiment of the present invention. In other words, since color suppression is effected at an early stage of the color processing system, it is possible to eliminate color noise from a low luminance portion and suppress a false color caused by a saturated pixel of the CCD 1, without the need to unnecessarily enlarge an area to be color-suppressed.

Accordingly, as compared with the signal processing apparatus according to the first embodiment of the present invention, the influence of a saturated pixel of the CCD 1 is far more fully restrained from spreading over its surrounding pixels, whereby during the reproduction of a subject image on a television monitor or the like, its image quality is far more fully restrained from being degraded by a false color which differs from the color of a subject, not only in a high luminance portion of a final output image but also over the surroundings of the high luminance portion.

Figure 8:
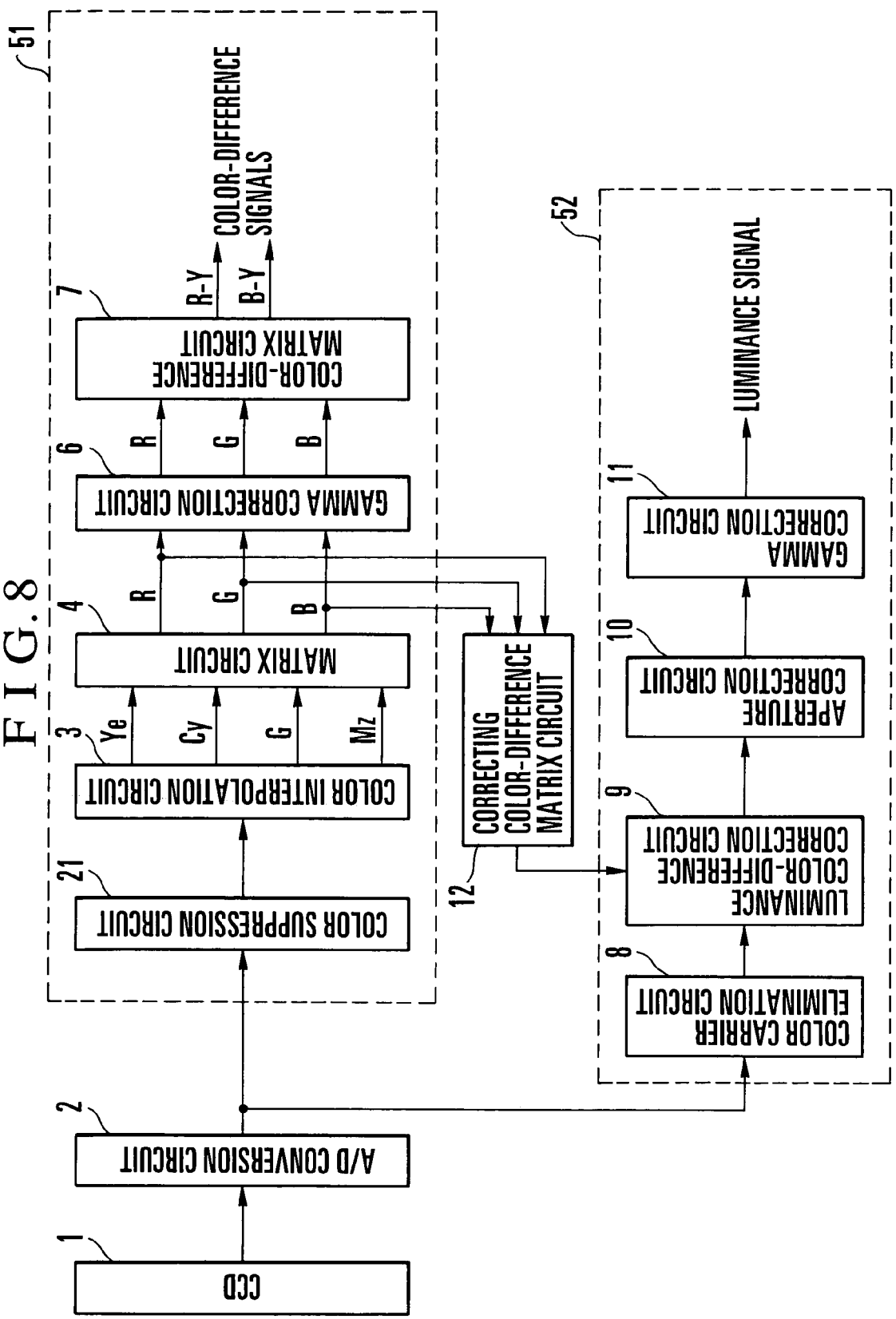
FIGS. 8 and 8A are schematic block diagrams showing the construction of a signal processing apparatus according to a third embodiment.
Figure 8A:
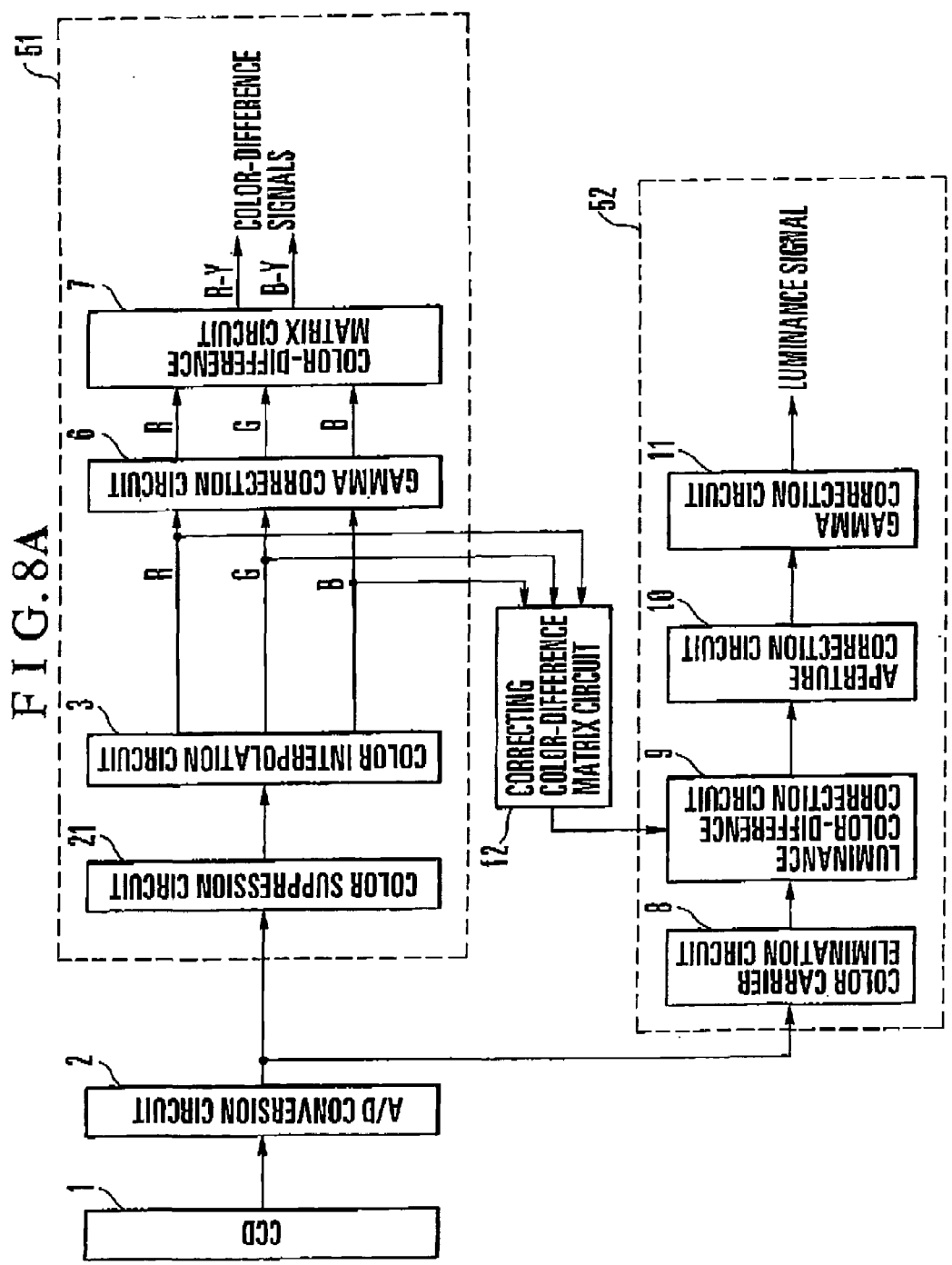

FIGS. 8 and 8A are schematic block diagrams showing a signal processing apparatus according to a third embodiment of the present invention.

In the signal processing apparatus according to the third embodiment of the present invention, the CCD 1, the A/D conversion circuit 2, the color interpolation circuit 3, the matrix circuit 4, the gamma correction circuit 6, the color-difference matrix circuit 7, the color carrier elimination circuit 8, the luminance color-difference correction circuit 9, the aperture correction circuit 10, the gamma correction circuit 11 and the correcting color-difference matrix circuit 12 are identical to the corresponding processing blocks of the signal processing apparatus according to the first embodiment of the present invention. However, a color suppression circuit 21 differs from the color suppression circuit 5 used in the first embodiment of the present invention, and is characterized by being capable of detecting a low luminance portion or a high luminance portion of a luminance signal and controlling, on the basis of the detection result, the level of a color of the digital signal outputted from the A/D conversion circuit 2, before color signals are band-limited by a series of processing blocks such as the color interpolation circuit 3 of the color processing system 51 which serves as band limiting means. For this reason, the color suppression circuit 21 will be mainly described below in detail with reference to FIG. 9.

As shown in FIG. 9, the color suppression circuit 21 includes a CCD output saturation detecting circuit 121, a delay circuit 122, a luminance signal generating circuit 123, multipliers 124 and 125, a subtracter 126 and an adder 127, and eliminates color noise from a low luminance portion and also suppresses a false color caused by the output of a saturated pixel of the CCD 1 which pixel contains a high luminance color. The color suppression circuit 21 receives and processes the digital signal outputted from the A/D conversion circuit 2, and this digital signal contains color information in time-series form.

Since the digital signal outputted from the A/D conversion circuit 2 is inputted to the color suppression circuit 21, the color suppression circuit 21 does not need the four multipliers 81 to 84 used in the color suppression circuit 13 of the second embodiment shown in FIG. 7, and needs only to include a single multiplier 124 which plays equivalent roles.

The CCD output saturation detecting circuit 121 is a circuit equivalent to the luminance level detecting circuit 70 used in the first embodiment of the present invention, and is arranged to output a color suppression coefficient k1 according to the level of a signal inputted to the CCD output saturation detecting circuit 121. Specifically, the CCD output saturation detecting circuit 121 calculates the color suppression coefficient k1 according to the level of the color of a specified pixel of the CCD 1 whose pixel signals are contained in the digital signal outputted from the A/D conversion circuit 2, and outputs the color suppression coefficient k1.

In the CCD output saturation detecting circuit 121, as described previously with reference to FIG. 5 which shows the relation between the level of the luminance signal Y (the horizontal axis) and the color gain coefficient k (the vertical axis), the color suppression coefficient k1 increases with the rise of the level of the input digital signal in a low luminance portion, whereas in a high luminance portion, the color suppression coefficient k1 decreases with the rise of the level of the input digital signal. Accordingly, it is possible to effect both elimination of color noise from the low luminance portion and color suppression to suppress a false color caused by a saturated pixel of the CCD 1 which pixel contains a high luminance color, by means of a single circuit.

The delay circuit 122 delays the digital signal outputted from the A/D conversion circuit 2, by a time interval corresponding to the output timing of the CCD output saturation detecting circuit 121. Normally, the delay circuit 122 uses a flip-flop or the like.

The luminance signal generating circuit 123 generates a luminance signal Y from a specified pixel of the CCD 1 and its surrounding pixels. Specifically, if the luminance signal Y is generated from the saturated pixel of the CCD 1 which has been detected by the CCD output saturation detecting circuit 121, and from pixels which surround the saturated pixel, the surrounding pixels also need color suppression. For example, in a CCD having a color filter arrangement such as that shown in FIG. 2, if the pixel 41 having a Ye color filter is saturated, the following four luminance signals are influenced by the saturation of the pixel 41: a luminance signal Y1 formed from the pixels 36, 37, 40 and 41; a luminance signal Y2 formed from the pixels 37, 38, 41 and 42; a luminance signal Y3 formed from the pixels 40, 41, 44 and 45; and a luminance signal Y4 formed from the pixels 41, 42, 45 and 46. Accordingly, color suppression needs to be performed by multiplying the signal of each of the pixels 36, 37, 38, 40, 41, 42, 44, 45 and 46 by the same color suppression coefficient k1.

As shown in FIG. 10, the luminance signal generating circuit 123 includes a one-horizontal-line data delay circuit 131, multipliers 132 and 133, hold-addition circuits 134 and 135, an adder 136 and a selector 137.

The one-horizontal-line data delay circuit 131 is capable of delaying pixel data for one horizontal line of the CCD 1 in the digital signal outputted from the A/D conversion circuit 2, and includes circuits such as a circuit which stores or reads pixel data for one horizontal line of the CCD 1 in or from an SRAM or the like.

The selector 137 is a circuit for selecting an arbitrary matrix coefficient optimum for conversion to RGB signals, according to color information to be multiplied by the digital signal outputted from the A/D conversion circuit 2 in each of the multipliers 132 and 133, i.e., any one of Ye, Cy, G and Mz complementary colors, (because the digital signal contains color information in time-series form) and then converting the digital signal outputted from the A/D conversion circuit 2 into the luminance signal Y, by means of a matrix coefficient of an expression (14) to be described later.

As shown in FIG. 2, each of the multipliers 132 and 133 multiplies the data of horizontally adjacent pixels of the CCD 1 together, and each of the hold-addition circuits 134 and 135 weights the data multiplied together by the corresponding one of the multipliers 132 and 133. The adder 136 adds together the signal outputted from the hold-addition circuit 134 and the signal outputted from the hold-addition circuit 135.

Accordingly, the luminance signal generating circuit 123 converts into RGB signals the digital signal which is outputted from the A/D conversion circuit 2 and which contains color information in time-series form, and subsequently converts the RGB signals, as represented by the following expression (14), and outputs the luminance signal Y:

$$Y = (0.3\ 0.59\ 0.11)\begin{pmatrix} R \\ G \\ B \end{pmatrix}. \tag{14}$$

The operation of the color suppression circuit 21 will be described below with reference to FIG. 9.

The digital signal outputted from the delay circuit 122 at timing adjusted by the same is multiplied by the color suppression coefficient k1 calculated in the CCD output saturation detecting circuit 121, in the multiplier 124. The luminance signal Y generated by the luminance signal generating circuit 123 is multiplied by the color suppression coefficient k1 in the multiplier 125, and the subtracter 126 subtracts the output of the multiplier 125 from the original luminance signal Y and outputs the difference (Y−k1Y). Thus, the adder 127 calculates the computation result and outputs a digital signal which is color-suppressed in time-series form.

In the color suppression of the digital signal, as the color suppression coefficient k1 becomes closer to "0", the level of the original digital signal is decreased and the digital signal is color-suppressed. Conversely, if the color suppression coefficient k1 is "1", the original digital signal remain unchanged. Therefore, the color suppression circuit 21 can eliminate color noise from the low luminance portion of the digital signal and also suppress a false color caused by a saturated pixel of the CCD 1 which pixel contains a high luminance color.

The operation of the signal processing apparatus according to the third embodiment of the present invention will be described below with reference to FIG. 8, and the following description will focus on the features of the third embodiment which differ from those of the first embodiment.

In the color processing system 51, first, the digital signal outputted from the A/D conversion circuit 2 is color-suppressed by the color suppression circuit 21, and the color interpolation circuit 3 outputs four complementary color signals of yellow (Ye), cyan (Cy), magenta (Mz) and green (G) for each pixel of the CCD 1. These complementary color signals are converted into pure color signals of red (R), green (G) and blue (B) by the matrix circuit 4, and are outputted therefrom as RGB signals. Then, predetermined processing is performed in the gamma correction circuit 6 and the color-difference matrix circuit 7, and color-difference signals R-Y and B-Y are outputted.

In the meantime, in the luminance processing system 52, the correcting color-difference matrix circuit 12 produces a luminance color-difference correction signal from the RGB signals outputted from the matrix circuit 4, in a manner similar to that of the first embodiment of the present invention, and performs luminance color-difference correction on a luminance signal from which its color carrier is eliminated. Then, the corrected luminance signal is subjected to aperture correction and gamma correction, and the thus-obtained luminance signal is outputted. Since the luminance signal generating circuit 123 is included in the color suppression circuit 21, the luminance signal outputted from the color carrier elimination circuit 8 is not inputted to the color suppression circuit 21.

In the signal processing apparatus according to the third embodiment of the present invention of FIG. 8A, the CCD 1 has a pure-color type filter as described on page 12, lines 1–12, hereinabove, so that RGB signals are contained in its output. This avoids the need for a matrix circuit which is used in F*ig*. 8. Also, as in F*ig*. 8, the color suppression 21A operates on these signals as output from the A/D conversion circuit 2 and supplies the compressed signals to the color interpolation circuit 3 which performs an interpolation process. The color suppression circuit 21A is similar to the color suppression circuit 21 of F*ig*. 8 and the color interpolation circuit 3 is similar to the color interpolation circuit of Fig 8, but each is adapted to operate on RGB signals. Likewise, the A/D conversion circuit 2, the gamma correction circuit 6, the color-difference matrix circuit 7, the color carrier elimination circuit 8, the luminance color-difference correction circuit 9, the aperture correction circuit 10, the gamma correction circuit 11 and the correcting color-difference matrix 12 are also like the corresponding components of the third embodiment of the invention of F*ig*. 8.

As described above, in the third embodiment of the present invention, color suppression is performed with the digital signal outputted from the A/D conversion circuit 2. Since color suppression processing is effected at an early stage of the color processing system, the color suppression processing can be effected before being influenced by band limitation performed by a series of processing blocks of the color processing system, whereby the influence of a saturated pixel of the CCD 1 is prevented from spreading over its surrounding pixels and, during the reproduction of a subject image on a television monitor or the like, correct color processing which yields high-quality images can be effected.

In a signal processing apparatus according to a fourth embodiment of the present invention which will be described later, a color correction circuit is used in place of the color suppression circuit 21 shown in FIG. 8 which has been referred to in the description of the third embodiment of the present invention. Specifically, if the saturation of a pixel of a CCD is detected, the saturated pixel is color-corrected by interpolating pixels which surround the saturated pixel, instead of performing color suppression by means of multiplication by the color suppression coefficient k1.

Accordingly, since the processing blocks other than the color correction circuit are identical to those of the third embodiment, the following description will focus on the color correction circuit.

The interpolation of the color correction circuit includes one- or two-dimensional linear interpolation, interpolation using the characteristic of a low-pass filter by enlarging the surrounding area of a pixel to be interpolated, or the like.

First of all, a color correction circuit which performs one-dimensional linear interpolation will be described below.

Figure 11:
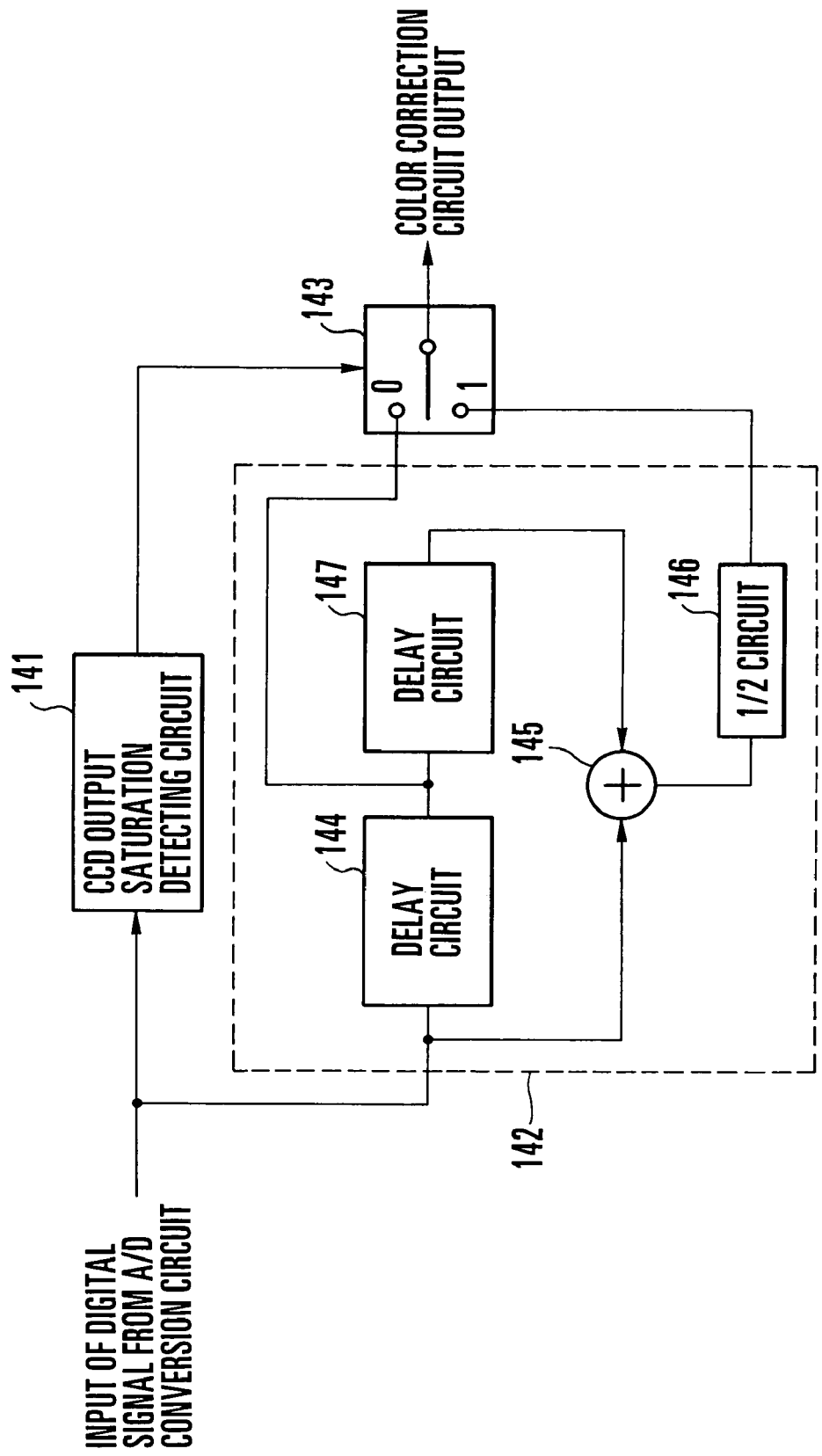
FIG. 11 is a view aiding in describing a case in which one-dimensional linear interpolation is used in a color correction circuit of a fourth embodiment.

FIG. 11 shows a color correction circuit for performing color correction by one-dimensional linear interpolation. The color correction circuit includes a CCD output saturation detecting circuit 141, an interpolation circuit 142, and a selector 143.

The CCD output saturation detecting circuit 141 outputs "1" if the digital signal outputted from the A/D conversion circuit 2 is saturated, or "0" if it is not saturated.

The interpolation circuit 142 is a circuit for interpolating a saturated pixel of the CCD 1 from its surrounding pixels of the same color as the saturated pixel. FIG. 11 shows the case in which the interpolation circuit 142 uses one-dimensional linear interpolation.

The selector 143 is switched over by the output of the CCD output saturation detecting circuit 141. Normally, the selector 143 is set so that the digital signal outputted from the A/D conversion circuit 2 is outputted without modification, and if the CCD 1 has a saturated pixel, the selector 143 is switched so that a digital signal in which the saturated pixel is interpolated is outputted from the interpolation circuit 142.

The interpolation circuit 142 includes delay circuits 144 and 147 each having the amount of delay equivalent to the distance between pixels of the same color in the CCD 1, an adder 145 and a ½ circuit 146. Specifically, the ½ circuit 146 serves to shift data by one bit toward a lower sideband (LSB). Accordingly, if the CCD output saturation detecting circuit 141 detects the saturation of a pixel of the CCD 1, the interpolation circuit 142 can perform interpolation by using the signals of pixels which surround the saturated pixels.

Then, a color correction circuit which performs interpolation using the characteristic of a low-pass filter by enlarging the surrounding area of a pixel to be interpolated will be described below.

Figure 12:
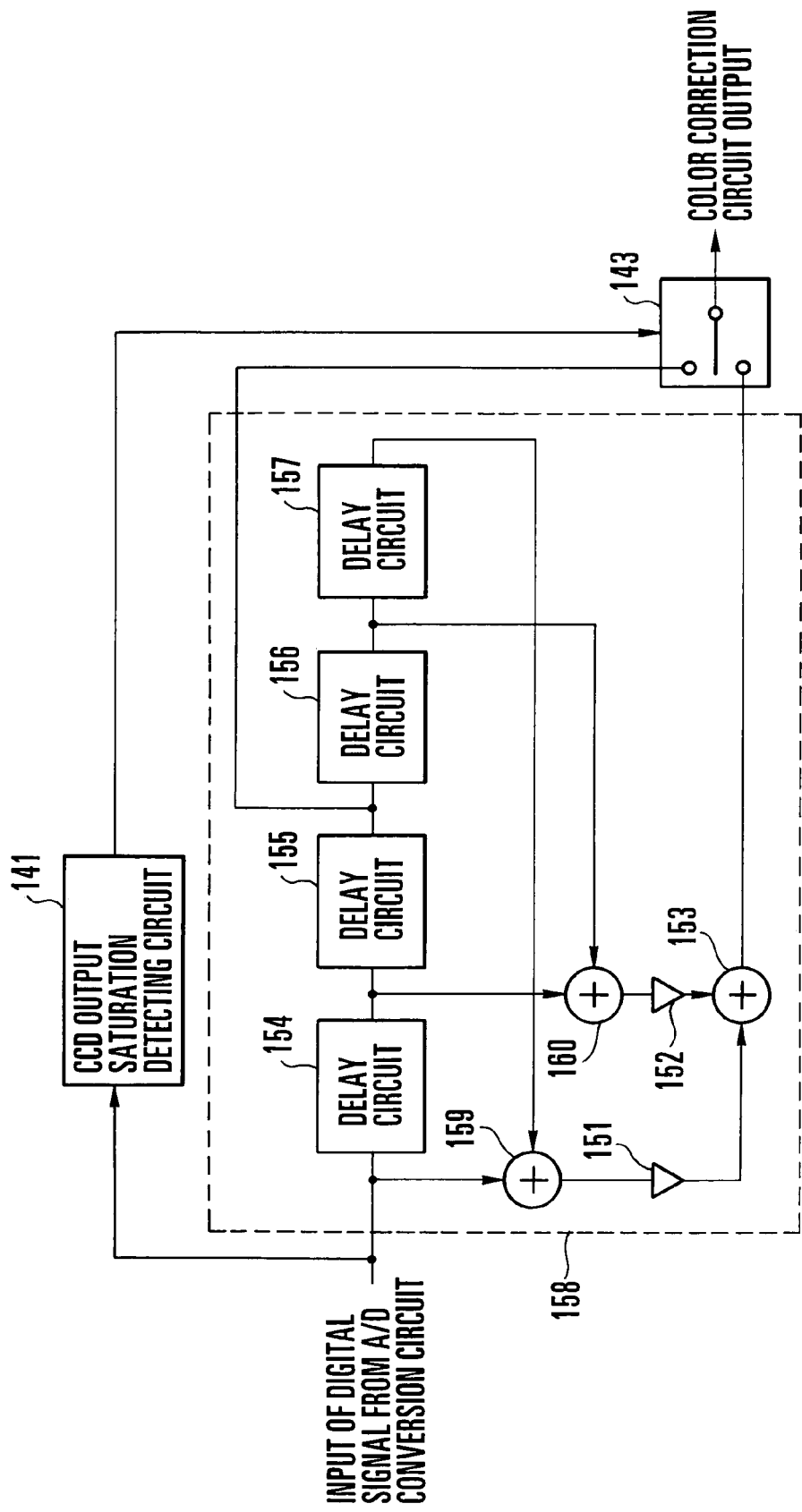
FIG. 12 is a view aiding in describing a case in which the characteristic of a low-pass filter is interpolated by enlarging the surrounding area of a pixel to be interpolated, in the color correction circuit of the fourth embodiment.
Figure 13:
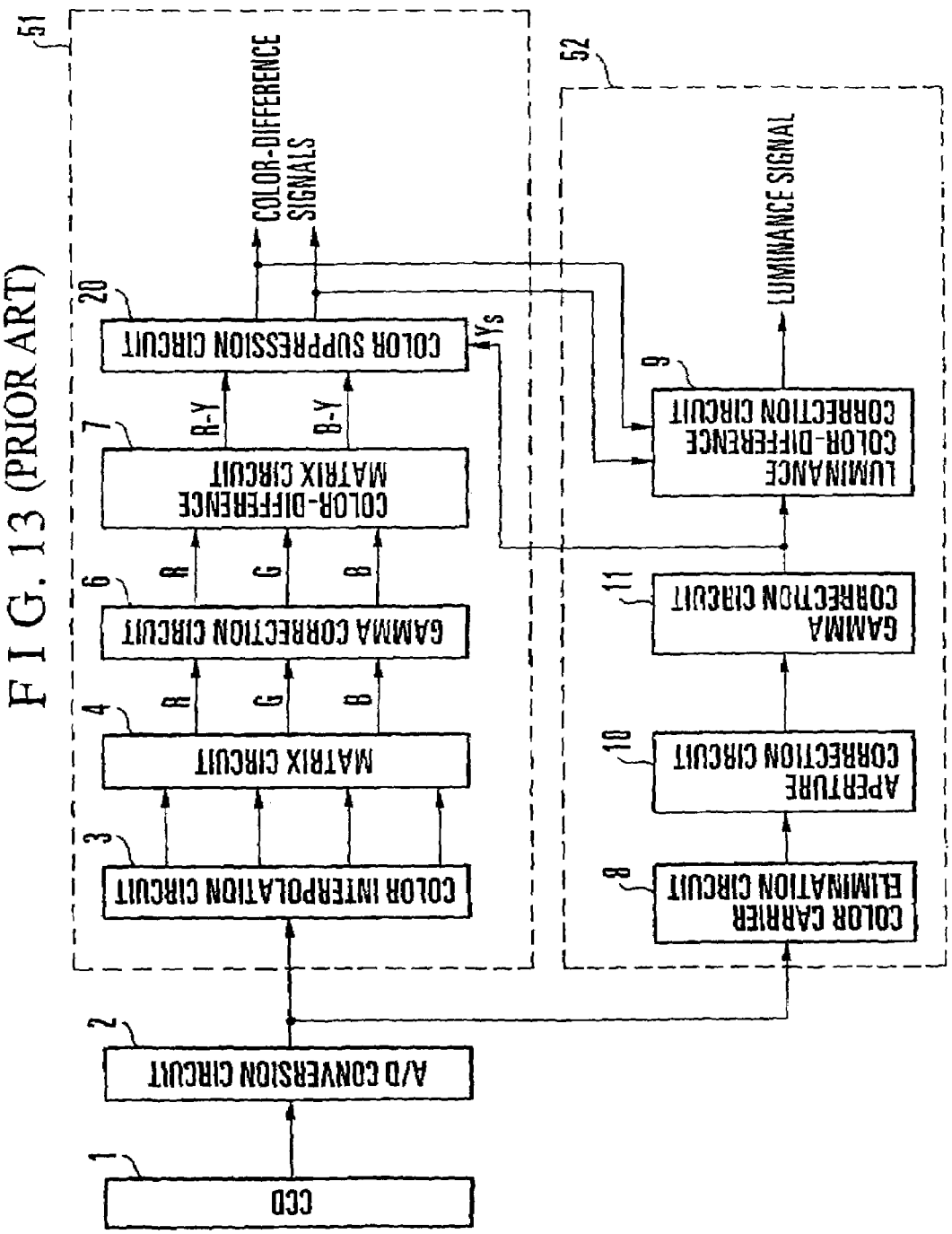
FIG. 13 is a schematic block diagram showing the construction of a conventional signal processing apparatus.

FIG. 12 shows a color correction circuit for interpolating the characteristic of a low-pass filter by enlarging the surrounding area of a pixel to be interpolated. Unlike the interpolation circuit 142 for performing color correction by one-dimensional linear interpolation, an interpolation circuit 158 includes, as shown in FIG. 12, four delay circuits 154, 155, 156 and 157, coefficient circuits 151 and 152, and adders 153, 159 and 160. In the interpolation operation of the interpolation circuit 158, the digital signal inputted from the A/D conversion circuit 2 and the output of the delay circuit 157 are added together by the adder 159, and the outputs of the delay circuits 154 and 156 are added together by the adder 160. The respective outputs of the adders 159 and 160 are multiplied by predetermined coefficients in the coefficient circuits 151 and 152, and the outputs of the coefficient circuits 151 and 152 are added together by the adder 153. In other words, the interpolation circuit 158 constitutes a digital filter whose filter characteristic is determined by the coefficients of the coefficient circuits 151 and 152. The operations of the circuits other than the interpolation circuit 158 are identical to those described above in connection with the one-dimensional linear interpolation shown in FIG. 11.

As described above, according to the fourth embodiment of the present invention, by adopting not color suppression but the processing of interpolating a saturated pixel of a CCD from its surrounding pixels of the same color, it is possible to realize a circuit having a smaller gate scale than the color suppression circuit.

In addition, in the fourth embodiment of the present invention, since color processing using the color correction circuit is effected at an early stage of the color processing system in a manner similar to that of the signal processing apparatus according to the third embodiment of the present invention, the color processing is prevented from being influenced by band limitation performed by a series of processing blocks of the color processing system. Accordingly, the influence of a saturated pixel of the CCD is prevented from spreading over its surrounding pixels and, during the reproduction of a subject image on a television monitor or the like, correct color processing which yields high-quality images can be effected.

For example, in the case of a subject image such as a human face, it is possible to reproduce a more natural image by processing a high luminance portion which reflects light, such as a head or a nose, by means of the interpolation circuit than by means of the color suppression circuit.

As is apparent from the foregoing description, in accordance with any of the first to fourth embodiments, since color suppression processing can be effected before being influenced by color processing, the influence of a saturated pixel of the CCD is prevented from spreading over its surrounding pixels and, during the reproduction of a subject image on a television monitor or the like, correct color processing which yields high-quality images can be effected.

Furthermore, it is possible to reproduce a far more natural image by processing a digital signal by means of the color correction circuit.

What is claimed is:

1. A signal processing apparatus which processes a signal outputted from an image pickup element having filters arranged to use plural kinds of colors, comprising:
    interpolation circuit which generates a plurality of color signals for each pixel position of the image pickup element by interpolation based on signals of pixels adjacent to said each pixel position of the image pickup element;
    color-difference signal forming circuit for forming color-difference signals based on output of said interpolation circuit;
    suppression circuit being provided between said color interpolation circuit and said color-difference signal forming circuit, which suppresses the plurality of color signals generated by said interpolation circuit, if a level of a luminance signal is out of a predetermined range;
    wherein it is so constructed that plurality of color signals suppressed which are output from said suppression circuit is regarded as input of said color-difference signal forming circuit.

2. A signal processing apparatus according to claim 1, further comprising gamma correction circuit provided between said suppression circuit and said color-difference signal forming circuit, which performs gamma correction on the plurality of color signals outputted from said suppression circuit.

3. A signal processing apparatus according to claim 2, further comprising luminance signal correcting circuit which corrects the luminance signal on the basis of the plurality of color signals suppressed by said suppression circuit.

4. A signal processing apparatus according to claim 3, wherein said luminance signal correcting circuit corrects the luminance signal before the luminance signal is gamma-corrected.

5. A signal processing apparatus which processes a signal outputted from an image pickup element having complementary color filters, comprising:
    interpolation circuit which generates complementary color signals for each pixel position of the image pickup element by interpolation based on signals of pixels adjacent to said each pixel position of the image pickup element;
    RGB matrix circuit which generates RGB signals from the complementary color signals interpolated by said interpolation circuit;
    color-difference signal forming circuit for forming color-difference signals based on the output by said RGB matrix circuit; and
    suppression circuit being provided between said interpolation circuit and said color-difference signal forming circuit, which suppresses the RGB signals generated by said RGB matrix circuit, if a level of a luminance signal is out of a predetermined range;
    wherein it is so constructed that RGB signals outputted from said suppression circuit are input into said color-difference signal forming circuit.

6. A signal processing apparatus according to claim 5, further comprising gamma correction circuit provided between said suppression circuit and said color-difference signal forming circuit, which performs gamma correction on the RGB signals outputted from said suppression circuit.

7. A signal processing apparatus according to claim 6, further comprising luminance signal correcting circuit which corrects the luminance signal on the basis of the RGB signals suppressed by said suppression circuit.

8. A signal processing apparatus according to claim 7, wherein said luminance signal correcting circuit corrects the luminance signal before the luminance signal is gamma-corrected.

9. A signal processing apparatus which processes a signal outputted from an image pickup element having complementary color filters, comprising:
    interpolation circuit which generates complementary color signals for each pixel position of the image pickup element by interpolation based on signals of pixels adjacent to each said pixel position of the image pickup element;
    RGB matrix circuit which generates RGB signals from the complementary color signals; and
    suppression circuit being provided between said interpolation circuit and said RGB matrix circuit, which suppresses the complementary color signals interpolated by said interpolation circuit, if a level of luminance signal is out of a predetermined range;
    wherein it is so constructed that the color signals outputted from said suppression circuit are inputted into RGB matrix circuit.

10. A signal processing apparatus according to claim 9, further comprising luminance signal correcting circuit which corrects the luminance signal on the basis of the complementary color signals suppressed by said suppression circuit.

11. A signal processing apparatus according to claim 10, wherein said luminance signal correcting circuit corrects the luminance signal before the luminance signal is gamma-corrected.

12. A signal processing apparatus which processes a signal outputted from an image pickup element having filters arranged to use plural kinds of colors, comprising:
    interpolation circuit which generates primary color signals or complementary color signals for each pixel position of the image pickup element by interpolation based on signals of pixels which adjacent to said each pixel position of the image pickup element; and
    suppression circuit provided between said image pickup element and said interpolation circuit, which suppresses a color signal outputted from the image pickup circuit, if a level of a luminance signal is out of a predetermined range.

13. A signal processing apparatus according to claim 12, further comprising luminance signal correcting circuit which corrects the luminance signal on the basis of the color signal suppressed by said suppression circuit.

14. A signal processing apparatus according to claim 13, wherein said luminance signal correcting circuit corrects the luminance signal before the luminance signal is gamma-corrected.

15. A signal processing apparatus which processes a signal outputted from an image pickup element having filters arranged to use plural kinds of colors, comprising:
    a color-suppression circuit, provided for primary color signals or complementary color signals obtained from said image pickup element, for color-suppressing said primary color signals or said complementary color signals in accordance with the level of luminance signal;

a gamma-correction circuit which gamma-corrects the output signals suppressed by said suppression circuit; and A/D conversion circuit for A/D converting primary color signals or complementary color signals obtained from said image pickup element before said color-suppression circuit.

16. A signal processing apparatus according to claim 15, further comprising:

a color-difference signal forming circuit for converting the output signals gamma-corrected by said gamma-correction circuit into color-difference signals.

17. A signal processing apparatus which processes a signal outputted from an image pickup element having filters arranged to use plural kinds of colors, comprising:

a color-suppression circuit, provided for primary color signals or complementary color signals obtained from said image pickup element, for color-suppressing said primary color signals or said complementary color signals in accordance with the level of luminance signal; and a color-difference signal forming circuit for converting the output signals color-suppressed by said color-suppression circuit into color-difference signals; and A/D conversion circuit for A/D converting primary color signals or complementary color signals obtained from said image pickup element before said color-suppression circuit.

18. A signal processing method which processes a signal outputted from an image pickup element having filters arranged to use plural kinds of colors, comprising:

interpolating a plurality of color signals for each pixel position of the image pickup element by interpolation based on signals of pixels adjacent to said each pixel position of the image pickup element;

forming color-difference signals based on output in interpolating step;

suppressing the plurality of color signals interpolated between said color interpolating step and said forming step, if a level of a luminance signal is out of a predetermined range;

wherein it is so processed that plurality of color signals suppressed which are output from said suppressing step is regarded as input of said forming step.

19. A signal processing method according to claim 18, further comprising:

A/D converting primary color signals or complementary color signals obtained from said image pickup element before said the signals are suppressed in said suppressing step.

20. A signal processing method according to claim 18, further comprising: performing, between said suppressing step and said forming step, gamma correction on the plurality of color signals outputted from said suppressing step.

21. A signal processing method according to claim 20, further comprising: correcting luminance signal on the basis of the plurality of color signals suppressed in said suppressing step.

22. A signal processing method according to claim 21, wherein said luminance signal is corrected before the luminance signal is gamma-corrected.

23. A signal processing method which processes a signal outputted from an image pickup element having complementary color filters, comprising:

interpolating complementary color signals for each pixel position of the image pickup element by interpolation based on signals of pixels adjacent to said each pixel position of the image pickup element;

generating RGB signals by performing RGB matrix into complementary color signals interpolated in said interpolating step;

forming color-difference signals based on the output in said RGB matrix step; and suppressing, between said interpolating step and said forming step, the RGB signals generated in said RGB matrix step, if a level of a luminance signal is out of a predetermined range;

wherein it is so processed that RGB signals outputted in said suppressing step are input into said color-difference signal forming step.

24. A signal processing method according to claim 23, further comprising: performing gamma correction, between said suppressing step and said forming step, on the RGB signals outputted in said suppressing step.

25. A signal processing method according to claim 24, further comprising: correcting the luminance signal on the basis of the RGB signals suppressed in said suppressing step.

26. A signal processing method according to claim 25, wherein said luminance signal is corrected before the luminance signal is gamma-corrected.

27. A signal processing method which processes a signal outputted from an image pickup element having complementary color filters, comprising:

interpolating by generating complementary color signals for each pixel position of the image pickup element by interpolation based on signals of pixels adjacent to each said pixel position of the image pickup element;

generating RGB signals by performing RGB matrix into the complementary color signals interpolated in said interpolating step; and suppressing the complementary color signals interpolated in interpolating step between said interpolating step and said generating step, if a level of luminance signal is out of a predetermined range;

wherein it is so processed that the color signals outputted in said suppressing step are inputted into RGB matrix circuit.

28. A signal processing method according to claim 27, further comprising: correcting the luminance signal on the basis of the complementary color signals suppressed in said suppressing step.

29. A signal processing method according to claim 28, wherein said luminance signal is corrected before the luminance signal is gamma-corrected.

30. A signal processing method which processes a signal outputted from an image pickup element having filters arranged to use plural kinds of colors, comprising:

interpolating by generating primary color signals or complementary color signals for each pixel position of the image pickup element by interpolation based on signals of pixels which adjacent to said each pixel position of the image pickup element; and suppressing, between said image pickup element and said interpolating step, a color signal outputted from the image pickup step, if a level of a luminance signal is out of a predetermined range.

31. A signal processing method according to claim 30, further comprising: correcting the luminance signal on the basis of the color signal suppressed in said suppressing step.

32. A signal processing method according to claim 31, wherein said luminance signal is corrected before the luminance signal is gamma-corrected.

33. A signal processing method which processes a signal outputted from an image pickup element having filters arranged to use plural kinds of colors, comprising:
- a color-suppressing primary color signals or complementary color signals obtained from said image pickup element in accordance with the level of luminance signal; and
- a gamma-correcting the output signals suppressed in said color-suppression step; and
- A/D converting primary color signals or complementary color signals obtained from said image pickup element before said the signals are suppressed in said suppressing step.

34. A signal processing method which processes a signal outputted from an image pickup element having filters arranged to use plural kinds of colors, comprising:
- suppressing, primary color signals or complementary color signals obtained from said image pickup element, in accordance with the level of luminance signal;
- forming color-difference signal by converting the output signals color-suppressed in said color-suppressing step into color-difference signals; and
- A/D converting primary color signals or complementary color signals obtained from said image pickup element before said the signals are suppressed in said suppressing step.

* * * * *